United States Patent [19]

Milewits

[11] Patent Number: 6,045,941
[45] Date of Patent: Apr. 4, 2000

[54] METHOD TO DETERMINE THE STATE OF CHARGE AND REMAINING LIFE OF LITHIUM BATTERIES USED IN OILFIELD SERVICES APPLICATIONS

[75] Inventor: Marvin Milewits, Sugar Land, Tex.

[73] Assignee: Schlumberger Technology Corporation, Sugar Land, Tex.

[21] Appl. No.: 08/889,775

[22] Filed: Jul. 8, 1997

[51] Int. Cl.[7] .................................................. H01M 4/12
[52] U.S. Cl. ............................... 429/91; 429/90; 320/132
[58] Field of Search ............................ 429/101, 90, 91, 429/92; 320/132

[56] References Cited

U.S. PATENT DOCUMENTS

| | | |
|---|---|---|
| 4,025,700 | 5/1977 | Fagan et al. . |
| 4,060,666 | 11/1977 | Anes . |
| 4,126,735 | 11/1978 | Fritts . |
| 4,144,382 | 3/1979 | Takeda et al. . |
| 4,247,606 | 1/1981 | Uetani et al. . |
| 4,293,622 | 10/1981 | Marincic et al. . |
| 4,371,592 | 2/1983 | Gabano ..................... 429/91 |
| 4,376,810 | 3/1983 | Takeda et al. . |
| 4,388,380 | 6/1983 | De Haan et al. . |
| 4,399,202 | 8/1983 | Ikeda et al. . |
| 4,403,020 | 9/1983 | Dampier .................... 429/101 |
| 4,416,957 | 11/1983 | Goebel et al. . |
| 4,418,129 | 11/1983 | Goebel . |
| 4,438,182 | 3/1984 | Papzian . |
| 4,543,304 | 9/1985 | DeHaan ...................... 429/91 |
| 4,563,401 | 1/1986 | Kane et al. ................. 429/91 |
| 5,114,811 | 5/1992 | Ebel et al. .................. 429/194 |
| 5,569,553 | 10/1996 | Smesko et al. . |
| 5,624,767 | 4/1997 | Muffoletto et al. .......... 429/7 |

OTHER PUBLICATIONS

Excerpts from "Lithium Batteries" edited by Jean–Paul Gabano, 1983, pp. ix–xii, 43–44, 66–67, 303, 333.

"The impedance of the lithium–thionyl chloride primary cell", by Hughes, et al., Sep. 22, 1982, J. applied Electrochemistry, 13 (1983), pp. 669–678.

Excerpts from "Handbook of Batteries" by David Linden, 1995, pp. vii–viii, ix–xiv, 14.28–14.29.

*Primary Examiner*—Maria Nuzzolillo
*Assistant Examiner*—Carol Chaney
*Attorney, Agent, or Firm*—John J. Ryberg

[57] ABSTRACT

The present invention relates to a new method of constructing and interrogating electrochemical cells, especially those having lithium thionyl chloride ($Li/SOCl_2$) chemistry, that permits rapid estimation of remaining discharge capacity. A preferred embodiment of the present invention employs cells with specially modified anode structures and a method for testing the state of charge and remaining life of these cells, as well as depassivating these cells, prior to their intended use or re-use. The test method can be performed using an inexpensive DC circuit and voltmeter at ambient conditions anytime prior to cell use or re-use. There is also disclosed an oilfield services downhole tool battery having a remaining life indicator comprising a housing containing one or more electrochemical cells having an internal anode means which selectively gets consumed at a predetermined state of discharge thereby creating a step change in the cell output voltage which is imperceptible to the tool while in operation at downhole temperatures, and which is capable of being detected at the surface under ambient temperatures upon administering of a suitable current load enabling the user to determine the remaining battery life at the surface prior to subsequent use or reuse of the battery in downhole oilfield services operations.

22 Claims, 21 Drawing Sheets

BLI Model

SINGLE CELL BEHAVIOR

TWO CELL BEHAVIOR

Anode Reaction:
$4Li \longrightarrow 4Li^+ + 4e^-$

Cathode reaction:
$2SOCl_2 + 4e^- \longrightarrow S + SO_2 + 4Cl^-$

Overall Reaction:
$4Li + 2SOCl_2 \longrightarrow 4LiCl + S + SO_2$
(s) (l)    (s)   (s) (g)

METHOD TO DETERMINE THE STATE OF CHARGE AND REMAINING LIFE OF LITHIUM BATTERIES USED IN OILFIELD SERVICES APPLICATIONS

BACKGROUND OF THE INVENTION

The present invention relates to a new method of constructing and interrogating electrochemical cells, especially those having lithium thionyl chloride ($Li/SOCl_2$) chemistry, that permits rapid estimation of remaining discharge capacity. A preferred embodiment of the present invention employs cells with specially modified anode structures and a method for testing the state of charge and remaining life of these cells, as well as depassivating these cells, prior to their intended use or re-use. The test method can be performed using an inexpensive DC circuit and voltmeter at ambient conditions anytime prior to cell use or re-use.

Determining the state of charge and remaining life of batteries is important particularly where the batteries are intended to be re-used for additional applications prior to disposal. For example, a special class of high performance batteries are presently used in the oilfield service markets (i.e., markets focusing on the subterranean search for hydrocarbons). Battery re-use is desired to spread the operational cost of the specialized battery over a number of field service jobs. Since these batteries must work in tools that operate from ambient to high temperatures in confining environments, they must have high volumetric energy density and function over a wide temperature range. Lithium thionyl chloride (LTC) chemistry is most frequently used to meet these stringent conditions. However, the remaining life for this type of LTC battery is very difficult to establish because most measurable parameters (voltage, internal resistance, etc.) do not vary appreciably with depth of cell discharge until very near the cell's end of life. (See D. Linden, *Handbook of Batteries,* 2nd Ed., McGraw-Hill, New York, (1995) at section 14.28).

A typical LTC oilfield services battery is often designed with a useful life of up to 1700 hours (depending on the tool loads applied), is used in applications where the temperature is typically less than 130° C. and the duration of the application may be than 100 hours. Therefore, if new batteries were placed in a tool, and the tool was used for one application, at the end of that application, the batteries would have sufficient life for use in one or more additional applications. However, at present, many batteries are disposed of after they have been consumed only partially and a new battery is used simply because the tool operator wants to make sure that there is sufficient life in the battery for the next operation. Such single usage is undesirable for a variety of reasons. Premature disposal of a battery wastes the remainder of the useful life of the battery, wastes battery chemistry, and creates added battery disposal costs regarding, e.g., the active unspent ingredients, e.g., lithium and thionyl chloride. As an alternative to disposing of a battery after its first use, some tool operators have attempted to maintain a log that measures and documents the battery's elapsed service life or conversely, amp-hours. However, automatic measurement of elapsed amp-hours is difficult to implement because it requires added electronic circuitry (i.e., a means for providing an on board processor capable of recording amp-hours or time) in either the battery or the tool. If the added circuitry is housed in the tool itself, then each battery needs to remain in the tool until the end of the battery's, life, otherwise, the tool's circuitry will lose track of that particular battery's elapsed amp-hours. If the added circuitry is housed in the battery itself, then each battery becomes more complicated thereby increasing expense and decreasing reliability for what is ultimately a disposable product. Neither of these options are practical in oilfield-service use where there is considerable pressure to keep disposable batteries and re-usable tools as inexpensive and simple to use as possible. Manually monitoring and maintaining a log of the number of amp-hours used in an oilfield services battery is time consuming, creates additional bookkeeping burdens, and may not consistently be carried out for each battery thereby leading to a great deal of uncertainty about a given battery cell's potential life span for use in another application. Another method of measuring battery life includes the measurement of the battery pack's DC or AC voltage; however, no clear correlation of signal to remaining capacity is obtainable, and in addition, complicated electronics are required.

Certain electrochemical cells have been described for achieving end-of-life indication during electrochemical discharge. Electrochemical cells for use in implantable medical devices have been described for generating a step change in output voltage during cell operation/discharge and prior to full cell discharge to enable the timely replacement of the cell under non-critical circumstances. Battery powered implantable medical devices require some means of end-of-life indication for the battery so that physicians have sufficient notice, or elective replacement indication, to complete replacement of the medical device and/or power source prior to system failure brought about by battery power depletion. For example, U.S. Pat. No. 4,293,622 to Marincic, et al., U.S. Pat. No. 4,563,401 to Kane, et al., and U.S. Pat. No. 5,569,553 to Smesko, et al., (all of which are incorporated herein by reference) describe electrochemical cells, particularly suitable for use in surgically implanted devices, which exhibit a step change in output voltage during operation/discharge of the cell sufficiently prior to full cell discharge to enable the timely replacement of the cell under non-critical circumstances. The cells of Marincic, Kane, and Smesko could thereby be casually replaced only when necessary, and before the depth of discharge has become critical.

The Marincic and Kane patents include lithium/thionyl chloride electrochemical cells characterized by an operating voltage which is essentially independent of the degree of cell discharge. Such cells are known to employ an electrolyte which includes an oxyhalide depolarizer together with a Lewis acid and Lewis base solute, a cathode structure formed from a finely ground metallic powder capable of functioning as a catalyst for oxyhalide reduction, and an alkali metal anode. The oxyhalide depolarizer may, for example, be thionyl chloride, sulfuryl chloride or phosphoroxy chloride. A typical Lewis acid and Lewis base is aluminum chloride and lithium chloride. The cathode structure may comprise carbon, platinum, or palladium. The alkali anode material may illustratively be lithium, calcium, sodium or potassium. Other materials may be suitable. As recognized by the Marincic and Kane patents, although such cells have greatly simplified the design of most electronic devices by substantially eliminating the need to consider voltage variations during essentially the entire life of the cell, this "flat voltage" characteristic has been a source of concern to designers of certain devices, notably pacemakers, infusion pumps, and other surgically implanted devices. Marincic and Kane note that the reason for concern is, of course, the inability to voltaicly determine the actual state of cell discharge and to predict the end of life prior to full cell discharge to enable the timely replacement of the cell under non-critical circumstances.

The Marincic patent teaches the use of an electrolyte-limited cell, i.e., a cell having a ratio of active components which result in the exhaustion of the thionyl chloride electrolyte prior to the other active materials. Electrolyte-limited cells show a step in output voltage when the cell is designed to avoid polarization; accordingly, attention is given to ensure that the cathode structure is not rate-limited below the anticipated discharge rate of the cell. The manifestation of the step is a product of the stoichiometry of the cell. The Kane patent discloses a cell construction offering an operating voltage which is essentially independent of the degree of cell discharge except for a desired number of step changes. Each of the step changes is, by cell design, of a desired magnitude and occurs at a pre-selected degree of cell discharge. The electrochemical cell of Kane comprises anode-functioning means, cathode functioning means, and electrolyte functioning means formed of respective materials which provide an electrochemical system characterized by an operating voltage essentially independent of the degree of cell discharge. The anode-functioning means includes a plurality of electrochemically active surface members arranged to become non-active at mutually different degrees of system discharge. In an embodiment described in Kane, there are two anode members having cylindrical shapes of non-uniform length to provide a greater thickness where the anode members are coextensive. A cylindrical cathode is provided radially inside the anodes. As each surface member becomes non-active, the remaining surface members must support the current capability of the cell depleted, increasing the internal cell resistance and consequently reducing the cell's operating voltage. As disclosed in Kane, in operation, the discharge rate over the entire surface of the anode material is the same. Accordingly, the thinner portion of the anode structure will become depleted first. The resultant lesser surface area of remaining anode material must support an overall current of the same magnitude. Since the total amount of anode surface area has been reduced, so has the current capability of the partially discharged cell. The consequential reduced output voltage level is a function of the discharge rate of the cell, and the amount of anode surface area remaining. It is thus controllable by adjusting the ratio of the surface area of the thinner anode layer to that of the thicker anode layer. By adjusting the actual layer thicknesses of the anode members of the Kane cell, the point or points at which the step change is manifested can be adjusted. The Smesko, et al. patent discloses, e.g., spiral wrapped or jelly roll cell design used to create a step change in the cell's voltage during operation. In each of the Kane, Smesko, and Marincic cells, the onset of reduced voltage output acts as an end-of-life indicator.

The Kane, Marincic and Smesko patents discussed above disclose electrochemical cell configurations designed to generate a step-wise, detectable reduced energy output so that the cell's end-of-life can be detected in situ during the cell operation to avoid, e.g., unnecessary replacement of a battery in a surgically implanted device. It would appear that these surgically implanted devices are placed into the body with the goal of detecting the battery end of life before a critical time while minimizing the need to perform additional surgical procedures to check on the battery life or to prematurely change a battery. The batteries used in surgically implanted devices therefore appear to be designed for a single use, and, as a consequence, must be monitored in situ to maximize the battery's useful life without resorting to additional surgical procedures to accomplish such monitoring. However, neither Kane, Marincic, nor Smesko describe how to actually monitor when the cell's end-of-life is near.

It would be reasonable to believe that the running voltage of a cell contained in a surgically implanted device is monitored during the operation of the cell.

During application of a tool, such as an oilfield services tool, the use a battery cell construction such as that described in Kane, Marincic or Smesko would be possible. However, the running voltage of the tool employing such cell can not be monitored during use, or would require that modifications be made to the tool to accommodate such monitoring thereby increasing the complexity and cost of the tool while potentially lowering the overall reliability of the tool and also precluding its implementation in preexisting tools. Further, the teachings of Kane, Marincic and Smesko do not address whether such end of life detection mechanisms would operate properly at temperatures higher than body temperature. For example, in the oilfield services area, a cell may be subjected to a range of operational temperatures during one use or during different uses. Therefore, a need exists for determining the state of charge or end of life of a battery that is potentially subjected to varying temperature conditions, including those ranging between ambient and 130° C. Also, in oilfield operations, unlike as taught in Marincic, the use of a thionyl chloride-limited cell presents a safety hazard if the liquid cathode/electrolyte, here, thionyl chloride, is consumed prior to the lithium anode. The cells used in the oilfield need to have an excess amount of cathode (i.e., excess thionyl chloride) in relationship to the lithium anode.

Additionally, if a battery is not disposed after its first use, then the battery either remains stored within the tool, or is taken out of the tool and placed in a storage area. Also, new batteries may often be stored for significant time prior to first use. Therefore, it is important to note that the general voltaic performance of LTC batteries depends greatly at ambient temperatures on the growth of LiCl surface layers on the internal electrodes which results in cell passivation. (See J. P., Gabano, *Lithium Batteries*, Academic, London, (1983)). Passivation greatly effects the voltaic performance of LTC batteries. The passivation effect results in a voltage delay, or the inability of the battery to hold its voltage under a given load when it is next used. At elevated temperatures such passivation effects are significantly diminished. The voltage delay becomes more pronounced with a heavier discharge load and lower discharge temperature, and is more severe in the Li/SOCl$_2$ than it is for other lithium batteries. Once the cell discharge is started, the passivation film layer is thinned gradually, the internal resistance returns to its nominal value, and the working voltage is reached. The extent of cell passivation depends partly on the cell thermal/load history and the cell test temperature. The passivation layer or film may be removed rapidly by application of high-current pulses for a short period or, alternatively, by applying a low load for many hours. However, many tool current loads are not high enough to depassivate a passivated LTC battery. Any use of a passivated LTC battery may create the potential for a tool misrun due to battery failure. Consequently, the study of LTC batteries by electronic interrogation means, including inferring remaining life by monitoring step voltage changes, is complicated by the added internal resistance resulting from cell passivation.

As a result, it became necessary to design a low cost, reliable and simple method and apparatus for determining the state of charge and useful life of a LTC-type battery system and to eliminate any existing passivation of such batteries prior to their use or reuse. This methodology is preferably compatible with existing tools or devices using such batteries, such as oilfield service tools, and provides an alternative to a hands-on record keeping for each battery or the use of on-board battery electronics. Additionally, this methodology preferably allows for battery pack removal from the tool, is not tool dependent and does not use up battery life by requiring additional electronics.

SUMMARY OF THE INVENTION

In a preferred embodiment of the present invention, there is disclosed an oilfield services downhole tool battery having a remaining life indicator. This battery comprises a housing containing one or more electrochemical cells having an internal anode means which selectively gets consumed at a predetermined state of discharge thereby creating a step change in the cell's output voltage which is imperceptible to the tool while in operation at downhole temperatures, and which is capable of being detected at the surface under ambient temperatures upon administering a suitable current load enabling the user to determine the remaining battery life at the surface prior to subsequent use or reuse of the battery in downhole oilfield services operations. In another preferred embodiment of the present invention, each of the electrochemical cell(s) comprise an alkali anode means comprising a first member having a first mass and a first surface area exposed to the interior of the cell and a second member having a second mass and a second surface area integrally nested with the first member such that the first and second anode members comprise a composite structured anode pair. Preferably, the first and second anode members are formed from the same electrochemically active material. The preferred cell structure also includes an oxyhalide cathode means comprising one or more surface members having surface areas coextensive with the exposed surface areas of the anode means. An electrolyte means is disposed between the coextensive surface areas of the anode means and the cathode means. In a preferred embodiment, the anode means, cathode means and electrolyte means are formed of respective materials adapted to provide a substantially constant output voltage at downhole temperatures after depletion of one of the anode members. Further, in a preferred embodiment, one anode member is depleted prior to the other anode member to produce a step change in the output voltage from a higher substantially constant output voltage to a lower substantially constant output voltage when measured at ambient temperature.

In another preferred embodiment, the first and second anode means comprise hollow cylindrical annular structures in coaxial relationship. The anode members are preferably formed from an electrochemically active alkali metal selected from the group consisting of lithium, sodium, potassium, calcium, their alloys and intermetallic compounds, and combinations thereof. The electrolyte means preferably includes an oxyhalide depolarizer together with a Lewis acid and Lewis base solute, and the oxyhalide depolarizer is preferably selected from the group consisting of thionyl chloride, sulfuryl chloride and phosphoroxy chloride. In another preferred embodiment, the Lewis acid is aluminum chloride and the Lewis base is lithium chloride.

The oilfield services battery of the present invention can preferably employ a cathode means that comprises a cylindrical structure inserted into a hollow cylindrical anode means. Additionally, the anode means can comprise a cylindrical structure inserted into a hollow cylindrical cathode means. In another preferred embodiment, the cathode means and the electrolyte are liquid thionyl chloride and the anode means is lithium. The anode structure means can also comprise a continuous structure. Further, in yet another preferred embodiment, the anode means comprises at least two anodes contained within individual electrochemical cell containers and coupled in parallel by electrically-connective means through their respective cell containers. Additionally, the anode, means can comprise at least two anodes which are physically separated and coupled in parallel by electrically-connective means.

In another embodiment, the second anode nests behind the first anode and is not exposed to the interior of the cell until the first anode is substantially depleted. Or, in another embodiment, the first anode nests behind the second anode and is also exposed to the interior of said cell.

In another preferred cell construction, the mass of the first anode is an arbitrary ratio of the mass of the second anode and the surface area of the first anode is an arbitrary multiplier of the surface area of the second anode. In a specific preferred cell-construction, the mass of the first anode is substantially the same as the mass of the second anode and the surface area of the first anode is two times greater than the surface area of the second anode. In yet another preferred cell construction, the mass of the first anode is four times the mass of the second anode and the surface area of the second anode is 0.75 of the surface area of the first anode. In still another preferred cell construction, the mass of the first anode is four times greater than the mass of the second anode and the surface area of the first anode is twice the surface area of the second anode.

There is also described a method of determining the remaining life in an oilfield services battery prior to or after the use or reuse of said battery for downhole oilfield operations comprising the steps of: providing an oilfield services downhole tool battery, such as those described herein, having a remaining life indicator comprising a housing containing one or more electrochemical cells having an internal anode means which selectively gets consumed at a predetermined state of discharge thereby creating a step change in the cell output voltage which is imperceptible to the tool while in operation at downhole temperatures, and which is capable of being detected at the surface under ambient temperatures upon administering a suitable current load enabling the user to determine the remaining battery life at the surface prior to or after use or reuse of the battery in downhole oilfield services operations. This battery is then interrogated with a sufficient current from an interrogating device at the surface at ambient temperatures prior to use or reuse sufficient to acquire repeatable loaded voltage values. A comparison of the loaded voltage values with predetermined values of voltage versus capacity for the battery is then performed to determine whether the step change in output voltage has occurred, indicating that a predetermined state of discharge has elapsed. In another preferred embodiment, the interrogating step further comprises the steps of: connecting said battery to an interrogating device; depassivating the battery by providing to the battery from the interrogating device a sufficient magnitude current pulse for a sufficient length of at a time until repeatable loaded voltage values are observed; and measuring the cell's voltage output.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow. And the accompanying drawings, which are given by way of illustration only and are not intended to be limitative of the present invention and wherein.

DETAILED DESCRIPTION OF THE PREFERRED EMBODIMENT

In a preferred embodiment of the present invention there is disclosed how to determine LTC battery remaining life by altering the anode electrode construction to give an indication of depth of discharge upon application of a defined load at ambient temperatures. A similar modification to cell construction is described in U.S. Pat. No. 4,563,401 to Kane, for implantable batteries without addressing the actual method for end of life determination. To fully develop this method, the theoretical model and generalized cell construction are discussed. This is followed by experimental data which demonstrate that at the present level of development a 20% resolution in discharge capacity determination is possible.

Theoretical Model

The remaining life determination concept depends on exploiting certain characteristics of the voltage-current (V-I) behavior of an electrochemical cell. Specifically, in a preferred embodiment of the present invention, the cell's electrode area is forced to change at a specific point (depth of discharge) during normal depletion and then detect this transition by interrogating the cell with a suitably large current load. Typically, the depletion occurs at hot downhole temperatures (i.e., temperatures that are approximately 130° C. and below) while the interrogation occurs after the job at ambient temperatures.

Figure 1A:
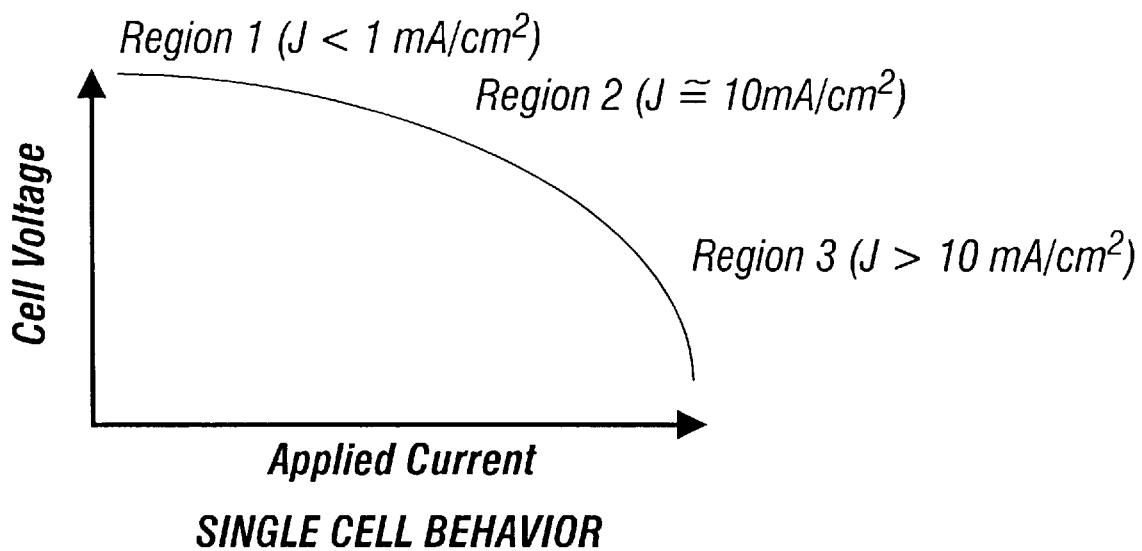
FIGS. 1(a) and 1(b) graphically depict the voltage versus current behavior for a 'normal' and 'altered' electrochemical cell.
Figure 1B:
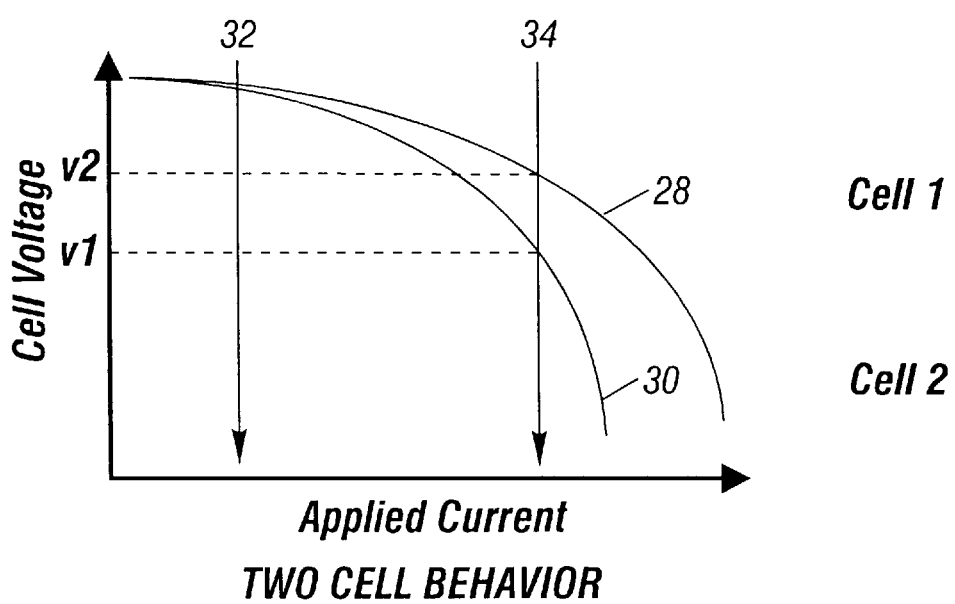

If there were no internal resistive losses, the (ideal) cell voltage would be constant as a function of applied current load. However, because there are several resistive loss mechanisms (i.e., electrolyte conductivity, reactant concentration polarization due to active material diffusion limits, and activation polarization of electrode processes for anode/cathode) the cell's voltage decreases as applied current is increased. To appreciate how these mechanisms are responsible for allowing battery life indication, described below is a 'normal' and 'altered' cell with respect to their V-I behavior. FIGS. 1(a) and 1(b) graphically depict the voltage versus current behavior for a 'normal' and 'altered' electrochemical cell.

V-I for Normal Cell

Referring now to FIG. 1(a) gives an illustrative example of a cell voltage versus applied current curve for a single normal cell. It is noted that the current density (J) equals current (I) divided by area (A). There are 3 regions shown, each which features the following properties: Region 1—For very low applied currents (with current density (J)<1.0 milli-amps per square centimeter (mA/cm$^2$)), cell voltage is essentially constant. Load voltage values in this region are practically determined by cell electrochemistry. Region 2—For moderate values of applied current (with J~1–20 mA/cm$^2$), the cell voltage decreases as a function of its internal ohmic resistance. The extent of this voltage drop depends on cell component conductivity, and the resistance of anode/cathode surface layers. Electrode area change is a predominant factor for the change in the curve in this region.

The battery life indication phenomenon utilizes this region of V-I behavior. Region 3—For very high values of applied current (with J>20 mA/cm$^2$), cell voltage falls off sharply as the limitation on active species diffusion occurs.

Figures 2, 3:
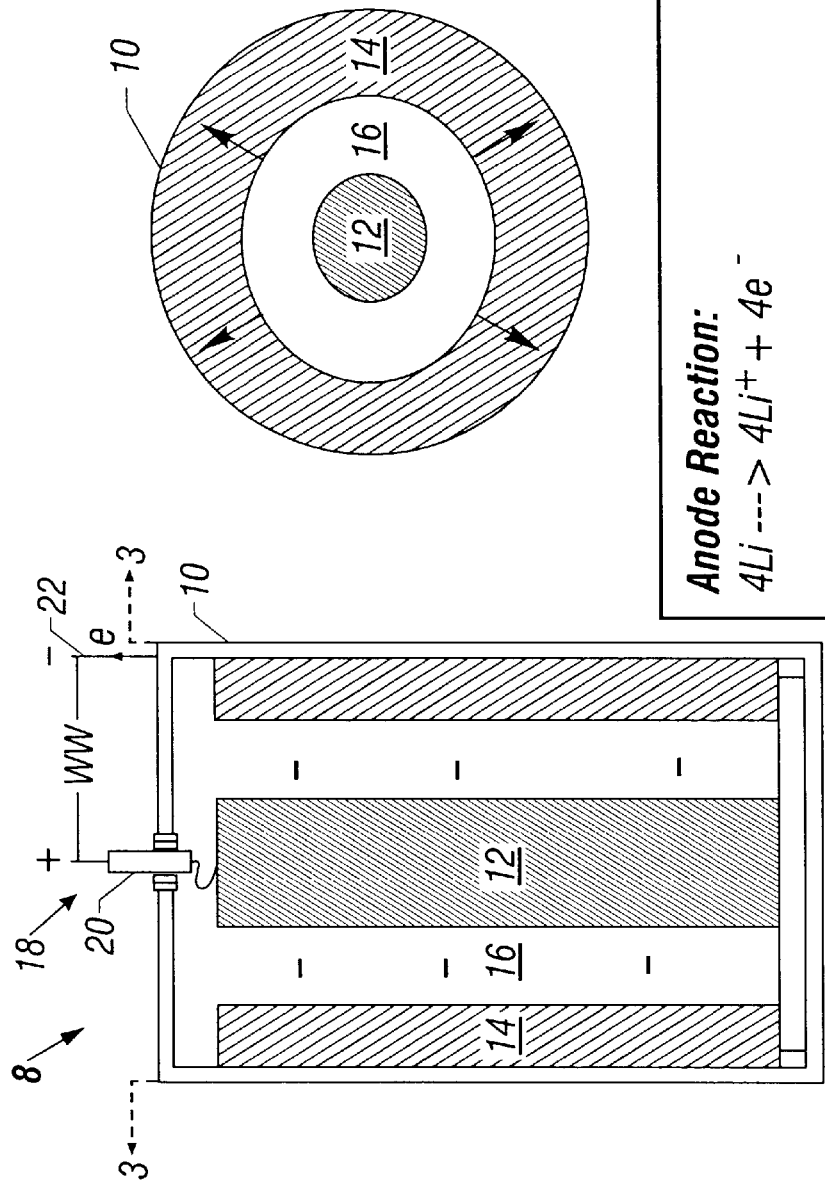
FIG. 2 is a sectional view of a standard lithium cell.
FIG. 3 is a cross-sectional view of the standard lithium cell taken along lines 3—3 of FIG. 2.

Referring now to FIG. 2, there is shown an idealized concept of a standard "bobbin" style lithium cell 8 having an outer cylindrical housing 10, centrally located carbon electrode means 12, an anode means 14 adjacent the inner walls of the outer housing, but separated from the electrode 12, a liquid cathode 16 filling the void inside of the cell outer housing 10 between the anode 14 and the electrode 12, a positive (+) electrode member 18 protruding through a Glass-to-Metal Seal 20 in the center top of the outer housing 10, and a negative (−) electrode section 22. FIG. 3 illustrates a cross-sectional view of the standard lithium cell taken along lines 3—3 of FIG. 2. With this standard lithium cell, the anode reaction can generally be represented as:

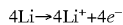

The cathode reaction is represented as:

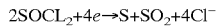

The overall reaction is:

where (s) represents a solid, (l) represents a liquid, and (g) represents a gas.

V-I for Altered Cell

FIG. 1(b) shows the salient features that make the battery life indication method work. V-I curves for two cells are displayed; Cell 1 depicting behavior for a high electrode area cell 28, Cell 2 for a low electrode area cell 30. For small currents (called Tool Load 32 in FIG. 1(b)), both cell types 28, 30 give the same loaded voltage 32. However, for a sufficiently higher test load current 34, the cell having the larger electrode area 28 exhibits a higher loaded voltage (V2>V1) because of its lower ohmic losses at lower current density. For a given current, a larger area yields a smaller current density (J) value. Conversely, FIG. 1(b) can also be re-interpreted as one cell having a 2-part anode structure. By knowing which of the two anode structures is active, one can infer depth of discharge (remaining life). Since each anode structure holds a certain fraction of total capacity, knowing which structure is active allows a determination of the cell's immediate capacity. In a preferred embodiment of the present invention, it is desirable to have the tool current load remain independent or transparent of the transition or step change between a high electrode area 28 and a low electrode area 30. For example, along the line marked Tool Load 32 in FIG. 1(b), if the tool current is sufficiently small, the "step" change cannot be detected. However, if the tool current is too large, then the condition noted by the Kane patent is applicable (i.e., the electrode area change can be detected during operation). it will be difficult to resolve either surface area. Referring to the battery life indicator cells described above for the surgically implantable devices, and also referring to FIG. 1(b), the pacemaker operational current will be along the line marked "Test Load" 34 in FIG. 1(b), so that during operation of the cell, it can be determined which structure of the anode is active (i.e., whether the transition or step change has occurred between the high surface area anode structure and the low surface area anode structure).

Figure 4A:
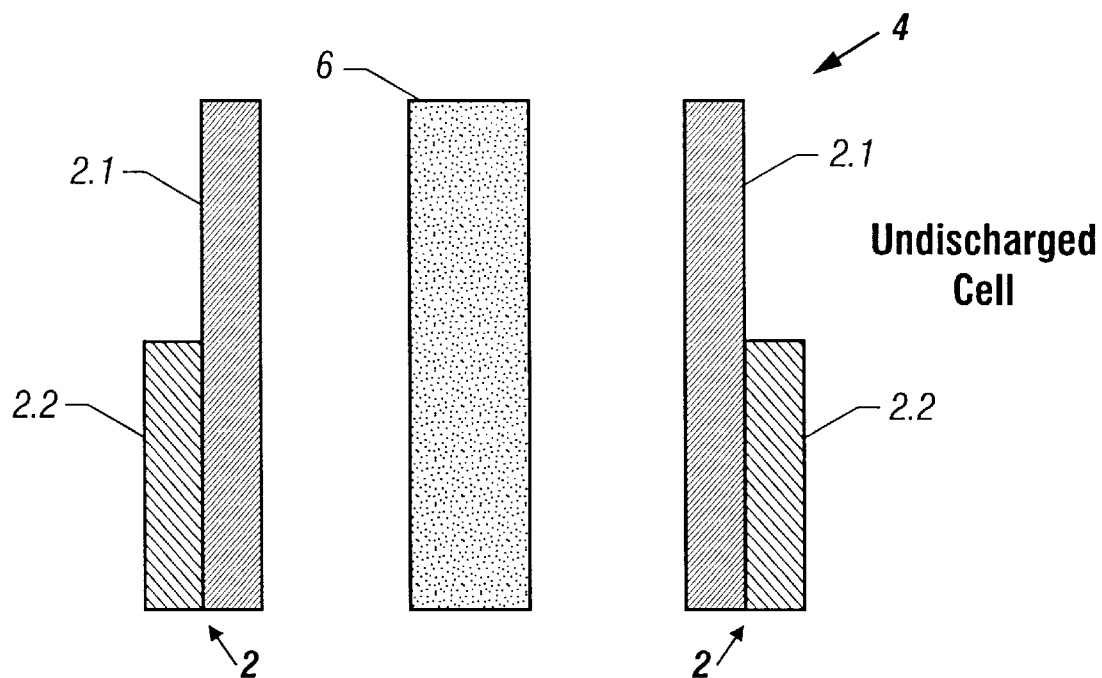
FIGS. 4(a) and 4(b) display the physical two-part model of the anode of a Battery Life Indicator ("BLI") cell according to a preferred embodiment of the present invention.
Figure 4B:
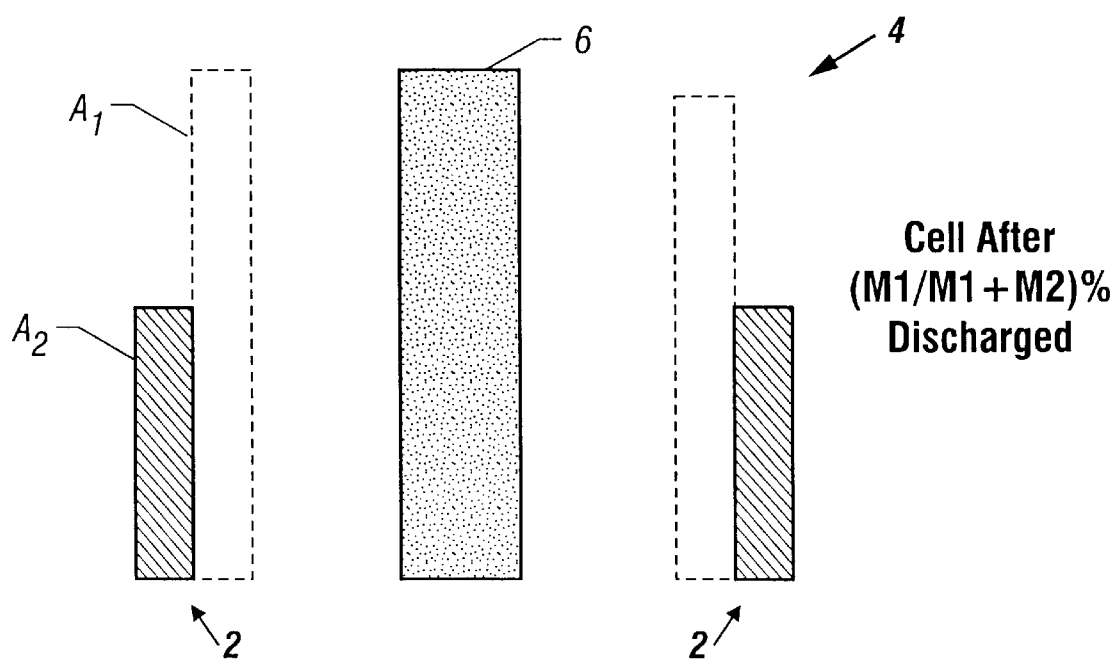

To fully clarify this concept, FIG. 4 displays a Battery Life Indicator ("BLI") composite electrochemical cell 4 having a carbon electrode 6 and an idealized physical layout of a two-part anode structure 2 before and after a certain amount of cell capacity is removed. For ease of interpretation, the other cell components (i.e. cathode, current collectors, separators, etc.) are omitted. As shown in FIG. 4(a), the anode structure 2 of an undischarged composite cell 4 is composed of two parts 2.1 and 2.2 with each part having a distinct surface area and mass, A1, A2, M1, and M2, respectively. For this example the areas and masses are arbitrarily considered as follows: A1>A2 and M1>M2. By assuming small depletion currents, it is envisioned that the anode structure is consumed in a wave front progression. FIG. 4(b) shows how the anode would look after (M1)/(M1+M2)×100% capacity is discharged. This change in cell capacity is inferred by applying a 'proper' current load and noting that the lower surface area electrode, A2, is now active. The term 'proper' refers to that current value which is high enough to give a large (V2−V1) difference (remaining life signal) but smaller than values corresponding to Region 3 in FIG. 1(a). Other factors which can greatly affect the magnitude and accuracy of this signal are the following:

a) Electrode Area Change—Larger transition change gives larger signal.

b) Electrode Gap Changes—Irregularities in gap distort onset of signal by affecting uniformity of anode consumption rate.

c) Impedance of Cell's Components—Higher conductivity lowers signal by reducing affect from anode geometry changes.

d) Electrode Passivation—This effect masks sensitivity to anode area change.

e) Temperature of Interrogation—Lower temperatures give larger signal by decreasing conductivity of other cell components.

f) Depletion Current Magnitude—Lower currents provide a more accurate signal since this allows a more uniform wave front anode dissolution.

EXPERIMENTAL DESIGN

BLI Cell Construction Details

To optimize the design of a preferred embodiment BLI cell structure, tests were conducted to determine what is the least amount of surface area that could be resolved at surface conditions for interrogating the cell. Two custom types of LTC experimental BLI cells were built by hand. Both experimental cell types used a bobbin electrode construction (see FIGS. 2 and 3 as modified by FIG. 4) with anode limited (approximately 11 Amp-Hour) design.

TABLE 1

| Battery Life Indicator Cell Details | | | |
|---|---|---|---|
| CELL TYPE | A2/A1 | M2/M1 | M2/(M1 + M2) |
| "50/50" | 0.50 | 1.0 | 0.50 |
| "75/25" | 0.75 | 0.25 | 0.80 |

Figures 5A, 5B:
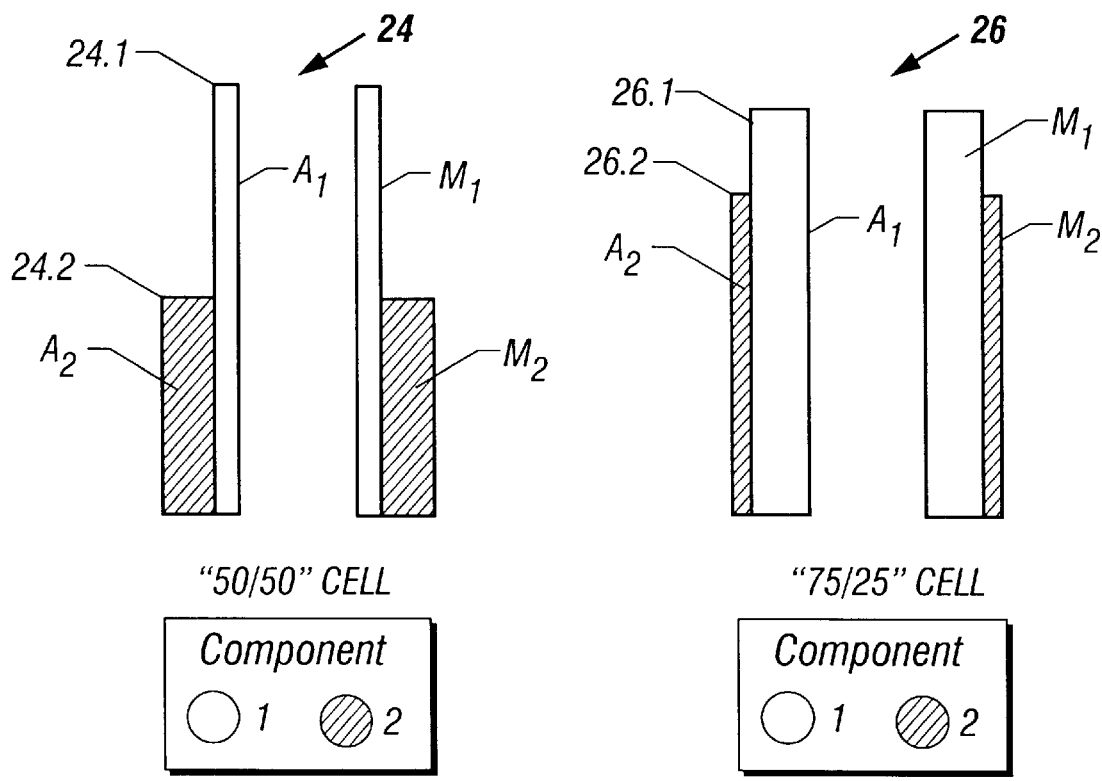
FIGS. 5(a) and 5(b) depict the anode structures for two experimental, hand-made BLI cells according to preferred embodiments of the present invention. The "50/50" BLI cells (FIG. 5(a)) have a two part anode structure, where the transition in electrode surface (going from full surface area to half surface area) is designed to occur when approximately half the capacity is used. Likewise, the "75/25" BLI cells have a two part anode structure where the transition in surface area is smaller, going from full area to three-quarters area when about 80% of capacity is used FIG. 6 graphically represents cell voltage versus amp-hours for the 50/50 cells being depleted at 100° C. with a 24 mA load.

As shown in Table I and FIG. 5, the first preferred LTC cell type consisted of cells denoted as "50/50" (24, FIG. 5(a)) and the second preferred LTC cell type was called "75/25" (26, FIG. 5(b)). As noted above, the larger the area change in the cell's anode structure, the greater the voltage change will be from a detectability standpoint. Therefore, the former type cells 24 were tested because these cells would provide the largest area change (50%) and largest signal possible to prove feasibility of the concept. The latter type cells 26 give an indication of resolution limits. 50/50 cells 24 have a two part anode structure 24.1, 24.2, where the transition in electrode surface (going from full area A1 24.1 to half area A2 24.2) is designed to occur when approximately half the capacity is used (i.e., a 50% area change occurs when 50% of the cell's capacity is spent). Although a 50% area change generates the largest transition signal, it is not desirable to indicate a battery's end of life after only 50% of its capacity has been used. Likewise, 75/25 cells 26 have a two part anode structure, 26.1, 26.2. However, in these cells the transition in surface area is smaller, going from full area A1 26.1 to three-quarters area A2 26.2. In addition, this smaller transition occurs when about 80% of capacity is used (i.e., a 25% area change occurs when 80% of the cell's capacity is spent). Although an 80% capacity change is a reasonable point at which to indicate a battery's end of life, the 25% area change is small thereby creating a smaller, and perhaps less detectable signal.

Testing Procedures

Figure 6:
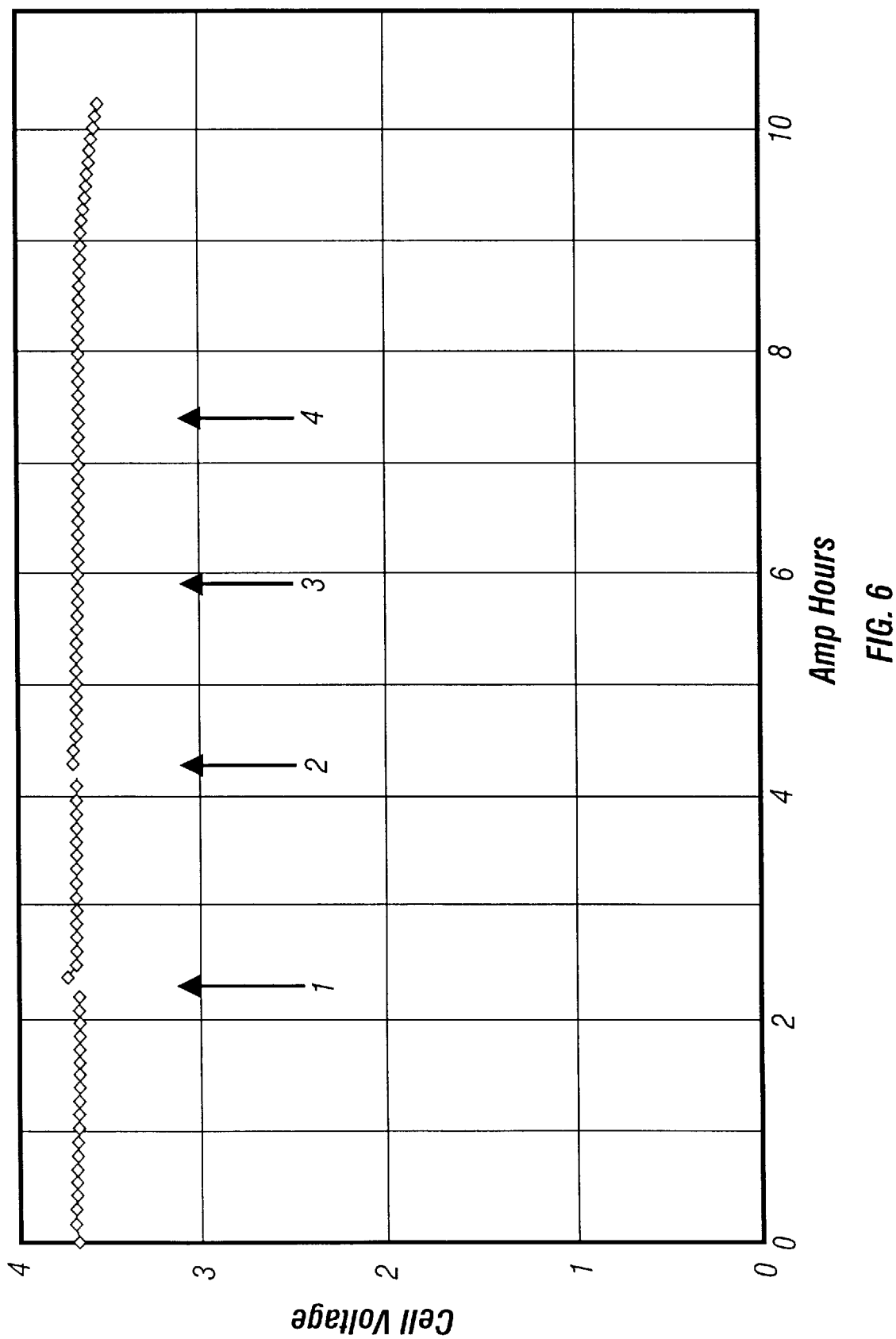
Figure 7:
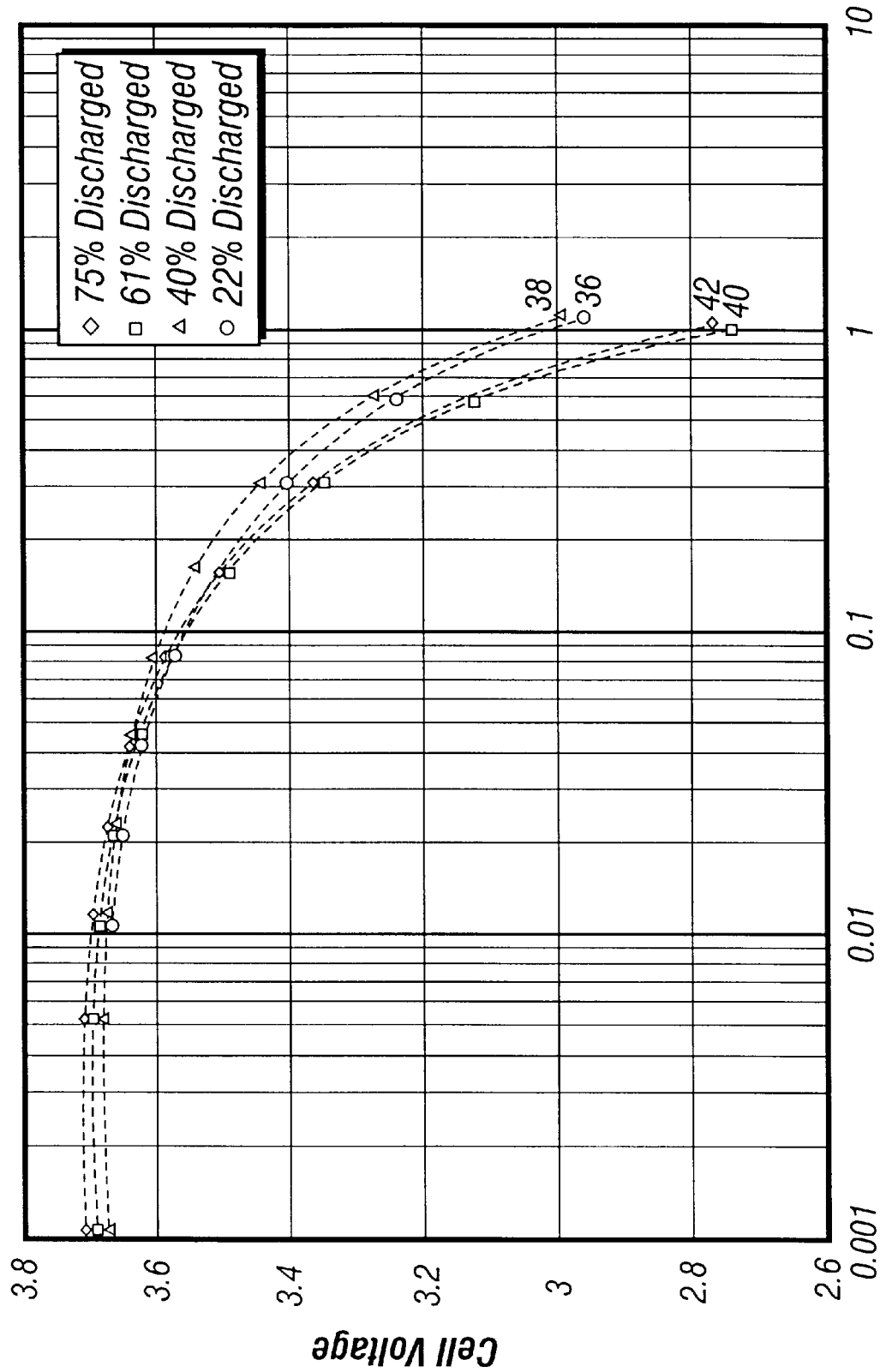
FIG. 7 graphically represents the cell voltage behavior versus applied current for 50/50 cells both before and after the transition in surface area has occurred.

Referring now to FIGS. 6 and 7, the evaluation of the cells was performed in two steps. The first step consisted of sequential discharge of about 2 amp-hours out of each cell with a 24 mA constant current load at 100° C. The 24 mA load is a typical tool load for one class of downhole tools. The second step was executed after each partial depletion and consisted of interrogating the cells at ambient temperature with a higher current load. This process was repeated approximately 4 times until end-of-life transition was achieved. In this way it was possible to obtain a measurement before and after the transition in electrode area occurred. A typical depletion curve for 50/50 cells at 100° C., 24 mA load is shown in FIG. 6, where each of the 4 sequential depletion portions are combined together to indicate total life. The curve shows the characteristic voltage versus discharge capacity (amp-hour) for LTC batteries at elevated temperatures, where the essentially flat loaded voltage behavior gives no indication of remaining life. In a 50:50 cell having a cell life of approximately 10 amp-hours, then the transition would be expected to occur at about 5.0 amp-hours. However, as shown in FIG. 6, the transition voltage change (which should occur at about 5.0 amp-hours) is indiscernible to a tool operating this particular BLI cell at downhole conditions (100° C.) at its normal tool load.

The crucial phase of testing involves the interrogation of the cells to infer remaining life at ambient temperature. Because passivation effects, caused in part by the growth of LiCl layers on the electrodes, are known to greatly affect V-I behavior, a special procedure was developed to minimize this distortion. This method consists of applying an increasing load for a set time and recording the resulting voltage at the end of this time. As the load is increased from 5 mA to 1 amp, the cell depassivates as the passivation effect of the LiCl layer is reduced because of changes in the underlying electrodes from electrochemical activity. In addition, this procedure also generates a V-I curve. The method is repeated twice to assure reproducibility of results. Results for a 50/50 cell are given in FIG. 7. Referring to FIG. 7, four curves are illustrated noting the V-I behavior of the 50/50 cell before transition (22% discharge, curve no. 36, and 40% discharge, curve no. 38) and after transition (61% discharge, curve no. 40, and 75% discharge, curve no. 42). At an applied current of one amp, the transition is readily detectable at room temperature, whereas at much lower applied currents of about 0.1 amp and below, the transition is difficult to discern. This applied current needs to be high enough to generate a transition signal that is detectable, i.e., at one amp, but if the applied current gets too high, the cell may not be able to intrinsically handle this higher current load. At a downhole tool temperature of, e.g. 100°–130° C., the BLI effect would decrease with increasing temperature. Therefore, measurement of the BLI effect in-situ is undesirable and will potentially be unresolvable. Thus, the use of a one amp applied current at room (ambient surface) temperatures is a preferred interrogation current and temperature for this particular tested BLI cell. However, by noting that this BLI cell has an internal electrode area of 88 $cm^2$, it can be generalized that approximately 11 $mA/cm^2$ is the preferred current density for single anode LTC cells.

To interrogate 75/25 cells requires a slightly different approach for the following two reasons:

a) Anode area change is smaller resulting in smaller signal, and b) Distorting effects from transition's nearness to end-of-life is a concern.

Figure 8:
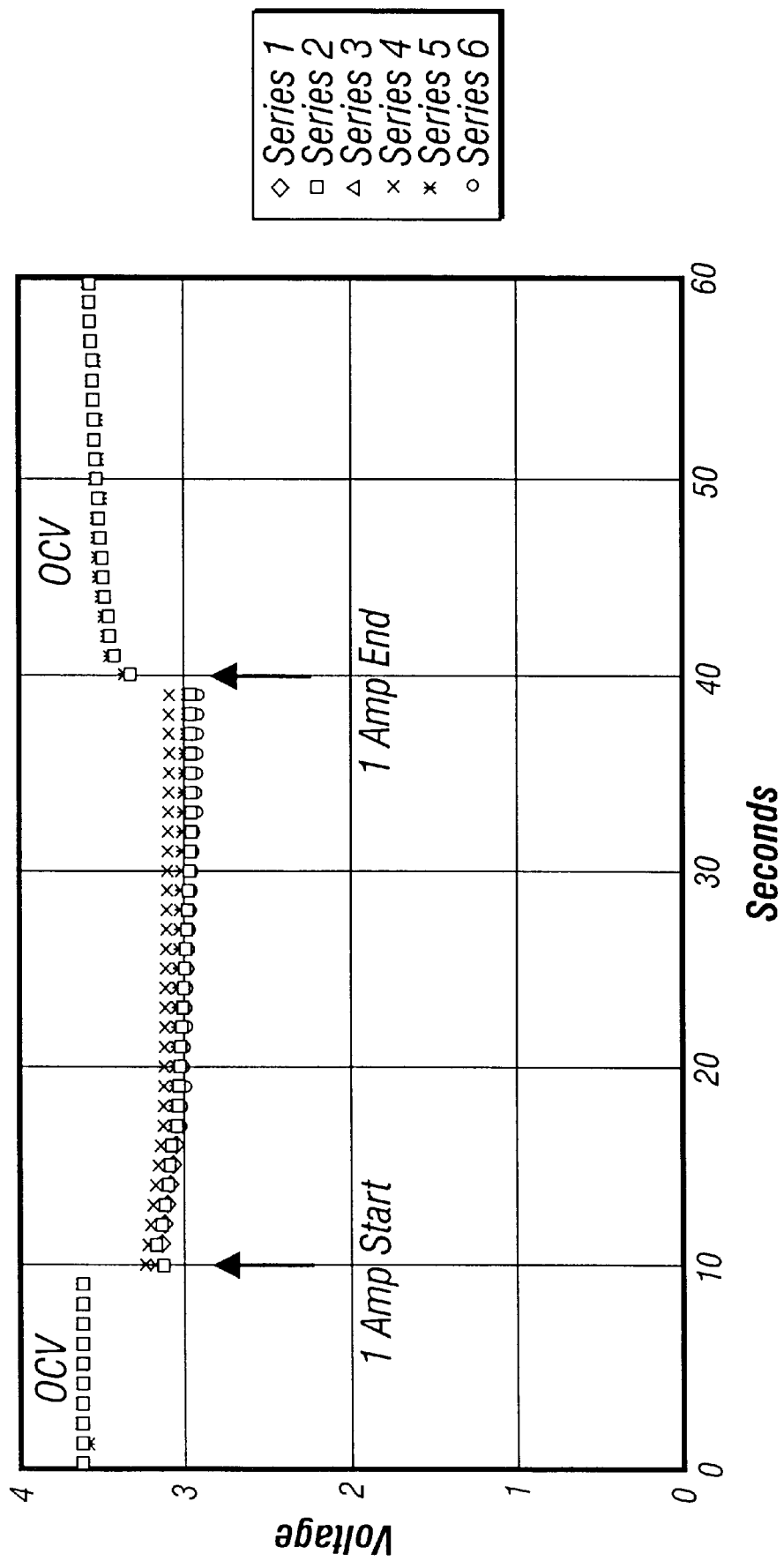
FIG. 8 is a graph of cell voltage versus time behavior for 75/25 cells undergoing the thirty-second interrogation/depassivation pulse according to a preferred embodiment of the present invention.

A one amp interrogating current pulse lasting 30 seconds is used on 75/25 cells, because it was established that this test current gives the clearest indication of electrode area change. Also, a single current load would be easier to electronically implement in a simple, cost-effective, field-usable interrogating device, thereby avoiding having to generate a V-I curve after each of the ten partial depletions. Multiple pulses are performed to assure reproducibility of results and to confirm that the cell is properly depassivated. Referring now to FIG. 8, there is shown a graph of cell voltage versus time behavior for 75/25 cells undergoing the thirty-second interrogation/depassivation pulse. As illustrated, after multiple 1 amp, 30-second pulses are performed, the passivation effect is substantially eliminated and the loaded circuit voltage can be measured. This graph illustrates the repeatability of the depassivation for six representative cells as well as showing the approximate magnitude of the voltage dip for cells depleted less than 80% (the built in transition point).

Results for 50/50 Experimental Hand-Made BLI Cells

Six different experimental 50/50 BLI cells were tested according to the above method. Referring again to FIG. 7, four different V-I curves of one particular 50/50 cell are displayed. Each V-I curve 36, 38, 40, and 42 was generated at four different times (approximately 20%, 40%, 60%, and 75% of discharge state, respectively). Referring to FIG. 7, the following observations can be made:

a) For I<100 mA (J<1 $mA/cm^2$), all 4 V-I curves are similar.

b) For I>100 mA, the two early life curves 36, 38 (20% and 40%) begin to diverge from the two latter life curves 40, 42 (60% and 75%).

c) For 5 mA<I<1 A, the two early life curves 36, 38 match each other closely, as do the latter life curves 40, 42.

d) The greatest voltage difference (remaining life signal) is about 200 mV/cell and occurs at the 1 amp (J~10–20 $mA/cm^2$) interrogating current.

Results for 75/25 Experimental Hand-Made BLI Cells

Figure 9:
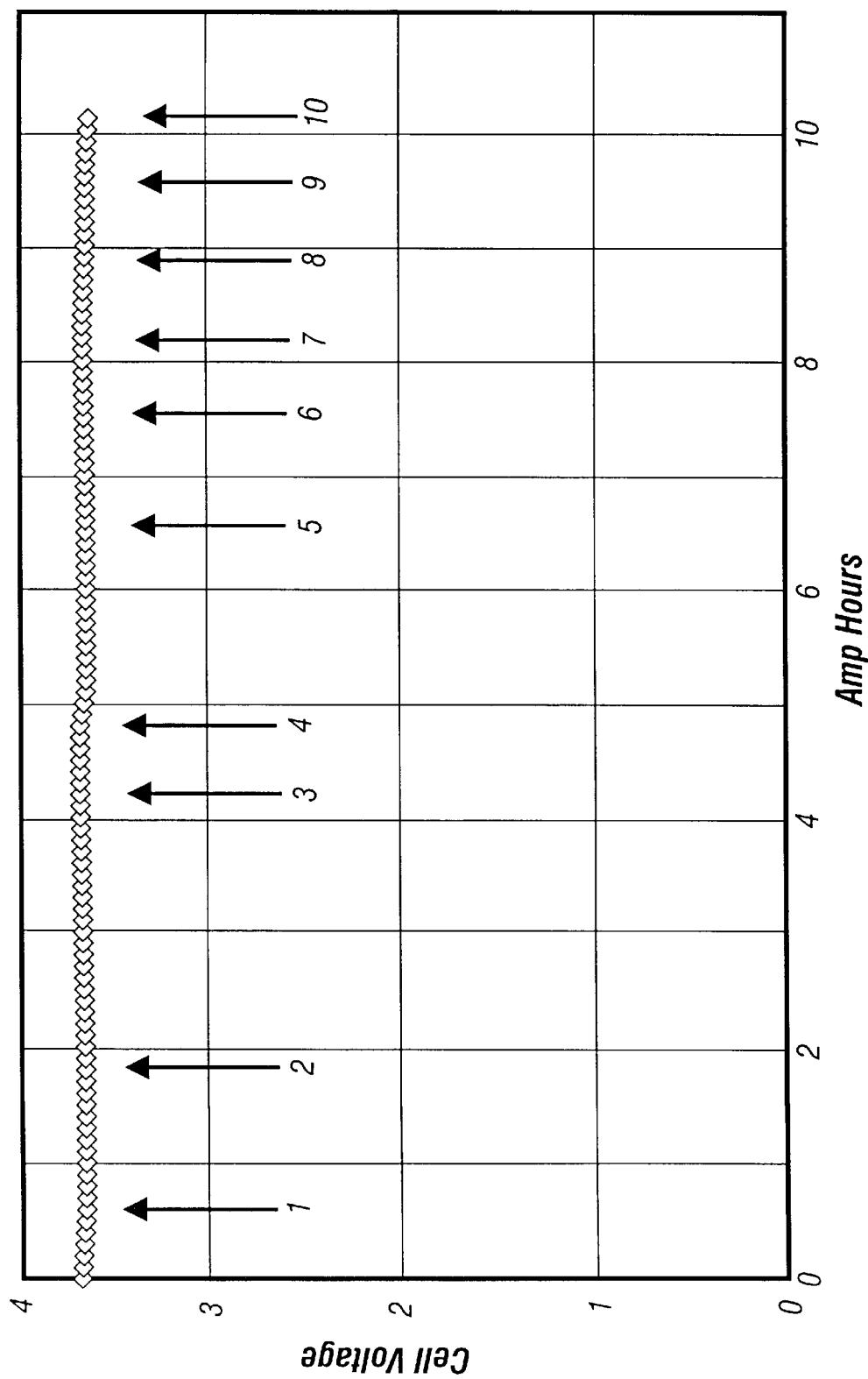
FIG. 9 graphically represents cell voltage versus amp-hours for the 75/25 cells being depleted at 100° C. with a 24 mA load.
Figure 10:
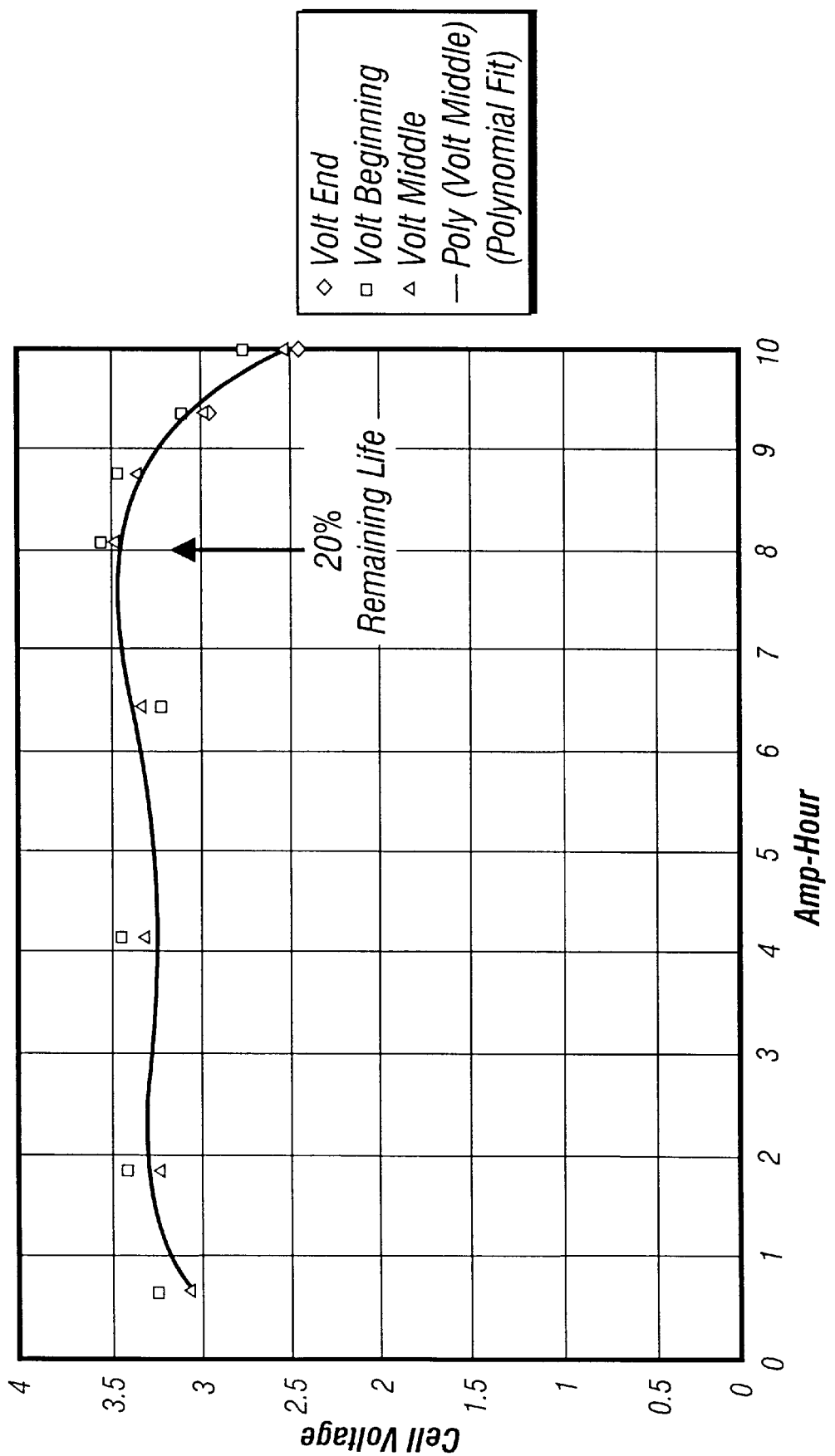
FIG. 10 graphically represents cell voltage versus amp-hours for 75/25 cells being interrogated with a one amp pulse for thirty seconds at room temperature after each depletion.

As was done with the 50/50 cells, six 75/25 experimental BLI cells were depleted with 24 mA constant current load at 100° C. However, for this type of cell, the depletion was performed in 10 separate portions rather than in 4 segments. This allowed smaller steps in state of discharge to be compared with each other to permit a more sensitive determination of when the transition occurred. FIG. 9 shows the cumulative cell voltage versus amp-hour for a typical 75/25 cell at 100° C. As occurs in FIG. 7 with the 50/50 cells, no distinguishable voltage differences appear between any of the 10 portions in the 75/25 cell depletion data illustrated in FIG. 9. In a 75:25 cell having a cell life of 10 amp-hours, the transition would be expected to occur at about 8.0 amp-hours. However, as shown in FIG. 9, the transition voltage change (that should occur at about 8.0 amp-hours) is indiscernible to a tool operating at downhole conditions (100° C.) at normal tool loads. FIG. 10 illustrates interrogation data for 8 of the 10 partial depletion portions. After each respective discharge section was completed, the cell was allowed to cool to ambient temperature and was subsequently subjected to a pulse of 1 amp for 30 seconds. Cell voltage was recorded at beginning, middle and end of the test load pulse (with a solid line graph generated by polynomial fit). Referring to FIG. 10, the following observations can be made:

a) Pulse load data prior to 8 amp-hour (20% remaining life) shows no clear cut trend.

b) After 8 amp-hour there is a linear fall-off of cell voltage with discharge state indicating that the second anode structure with reduced surface area is now active. However, the signal is somewhat weak, probably due to the imprecise anode electrode construction of these hand-made cells.

c) Unlike the depletion curve of FIG. 9, which does not show any voltage drop off, these data give a clearer, albeit statistically noisy, indication of nearing of end-of-life at almost 20% remaining life.

Figure 11:
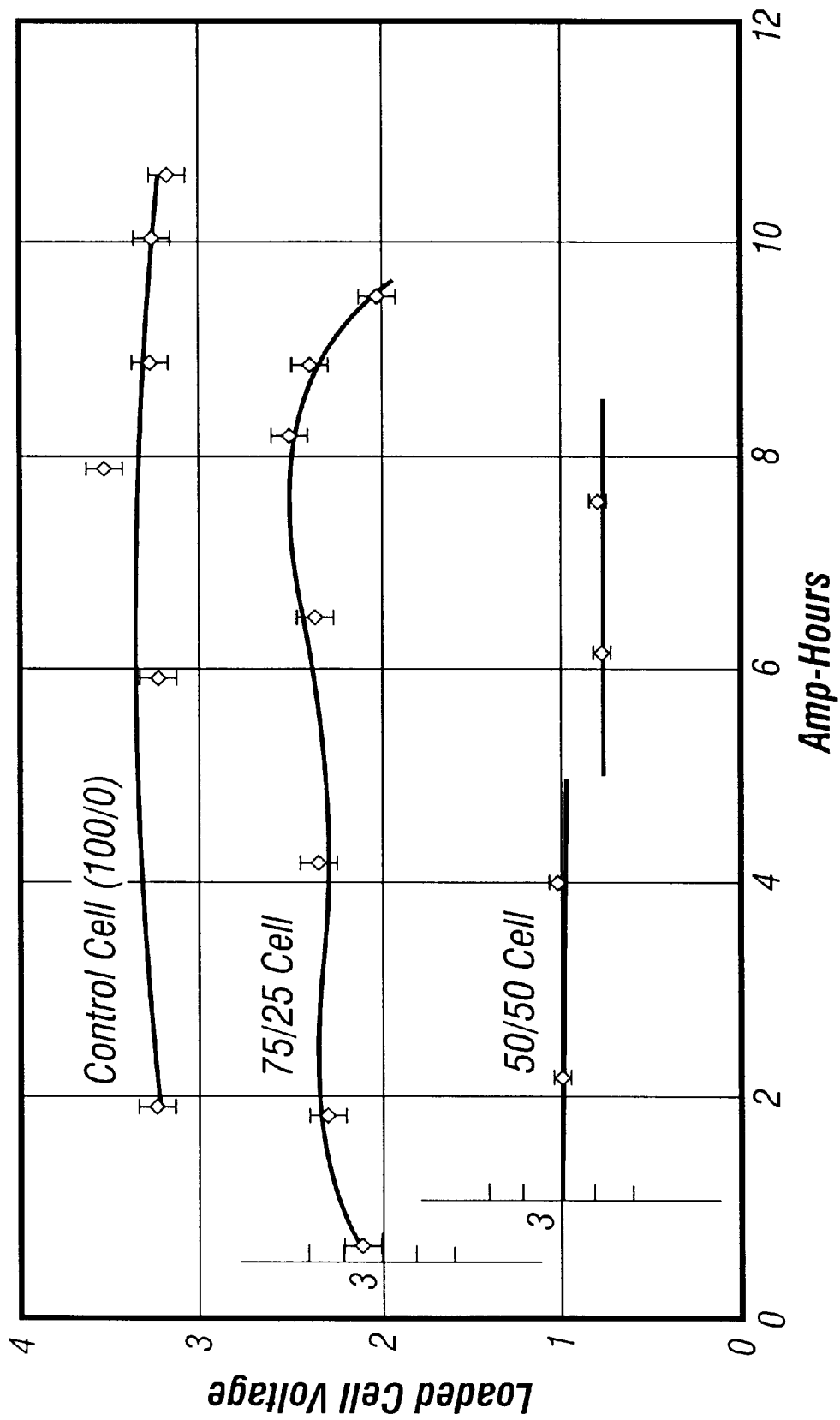
FIG. 11 graphically represents the loaded cell voltages versus amp-hours of the 50/50 BLI cells, the 75/25 BLI cells and a control cell.

As a final check on the accuracy of these battery life indicator cells, control cells having normally configured anode structures (such as illustrated in FIG. 2) were built and tested as set out above. The overall test results for 50/50, 75/25, and 100/0 (control cells) are illustrated in FIG. 11 (with the "cell voltage" axis depicted as offset for each cell for clarity). As discussed above, the 50/50 experimental 10 amp-hour BLI cell demonstrated a transition in the area between about 5 amp-hours. The 75/25 experimental 10 amp-hour BLI cell demonstrated a transition in the area of about 8 amp-hours, while the Control Cell did not demonstrate any transition indicating the approach of the end of battery life.

Based on results presented from testing the battery life indicator experimental hand-made cells, the following conclusions are made:

a) Anode structure alteration combined with specific load performance measurements is a viable method to give a single indicator of available capacity.

b) Based on comparisons with cells of differing anode area changes, best results are found for cells with largest area change (i.e., 50/50).

c) This method is independent of thermal history effects when cells are cycled up to ten times from 25° C. to 100° C.

To increase the utility of this method, new cells were constructed to further increase the remaining life signals. This was accomplished by designing the anode to give a 50% change in area at 20% remaining life. Additionally, this new cell construction was achieved using machine-made cells rather than hand-made cells.

BLI Machine-Made Unigage Cells

Figure 12:
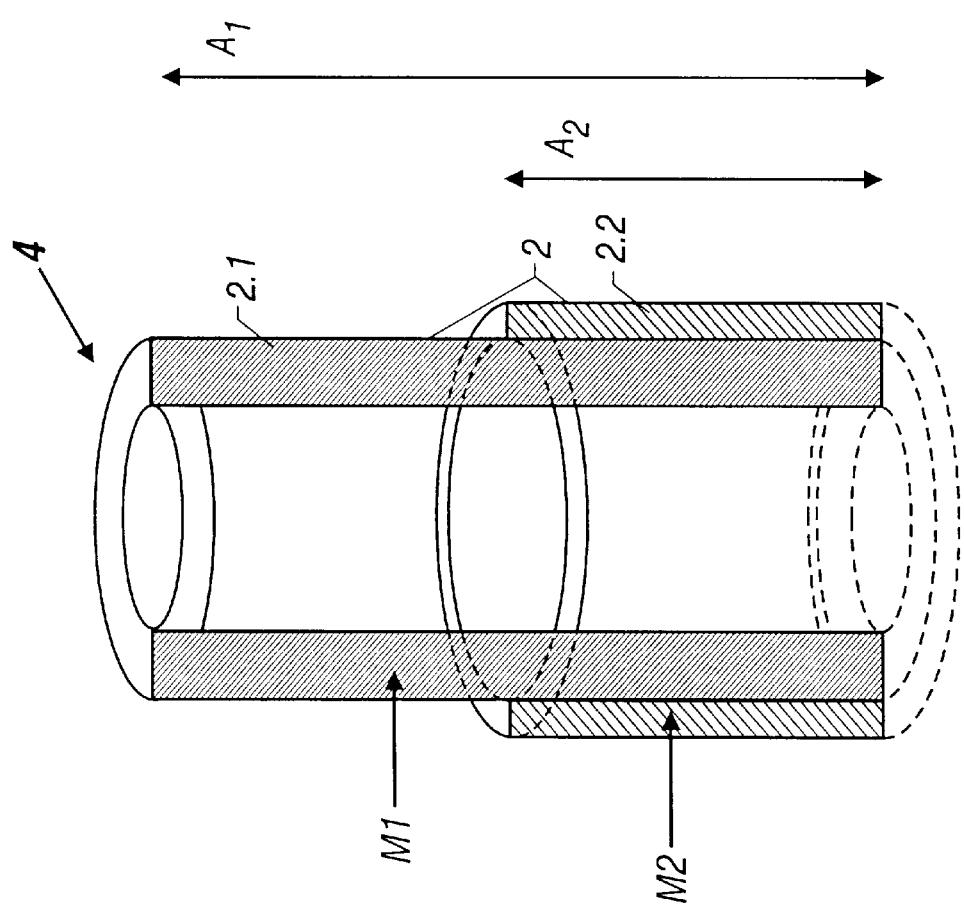
FIG. 12 represents a BLI machine made cell "50/80" composite electrode structure where a 50% area change will yield an 80% change in the capacity of the cell.
Figure 13:
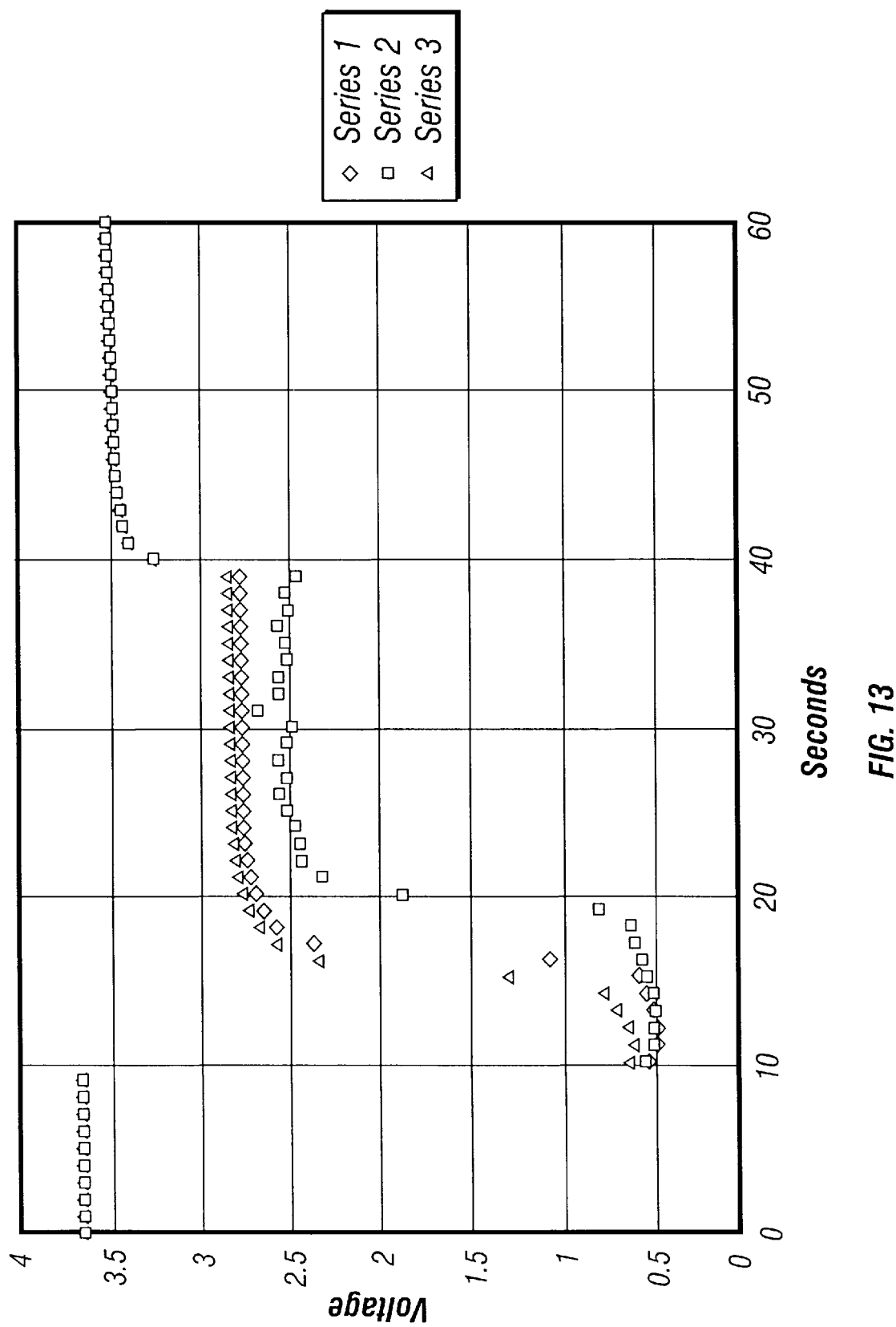
FIGS. 13–16 graphically illustrate voltage versus time lapse for undepleted BLI "50/80" cells at ambient temperature and shows the effect of passivation, and the manner in which the interrogation current serves also to depassivate the cell.
Figure 14:
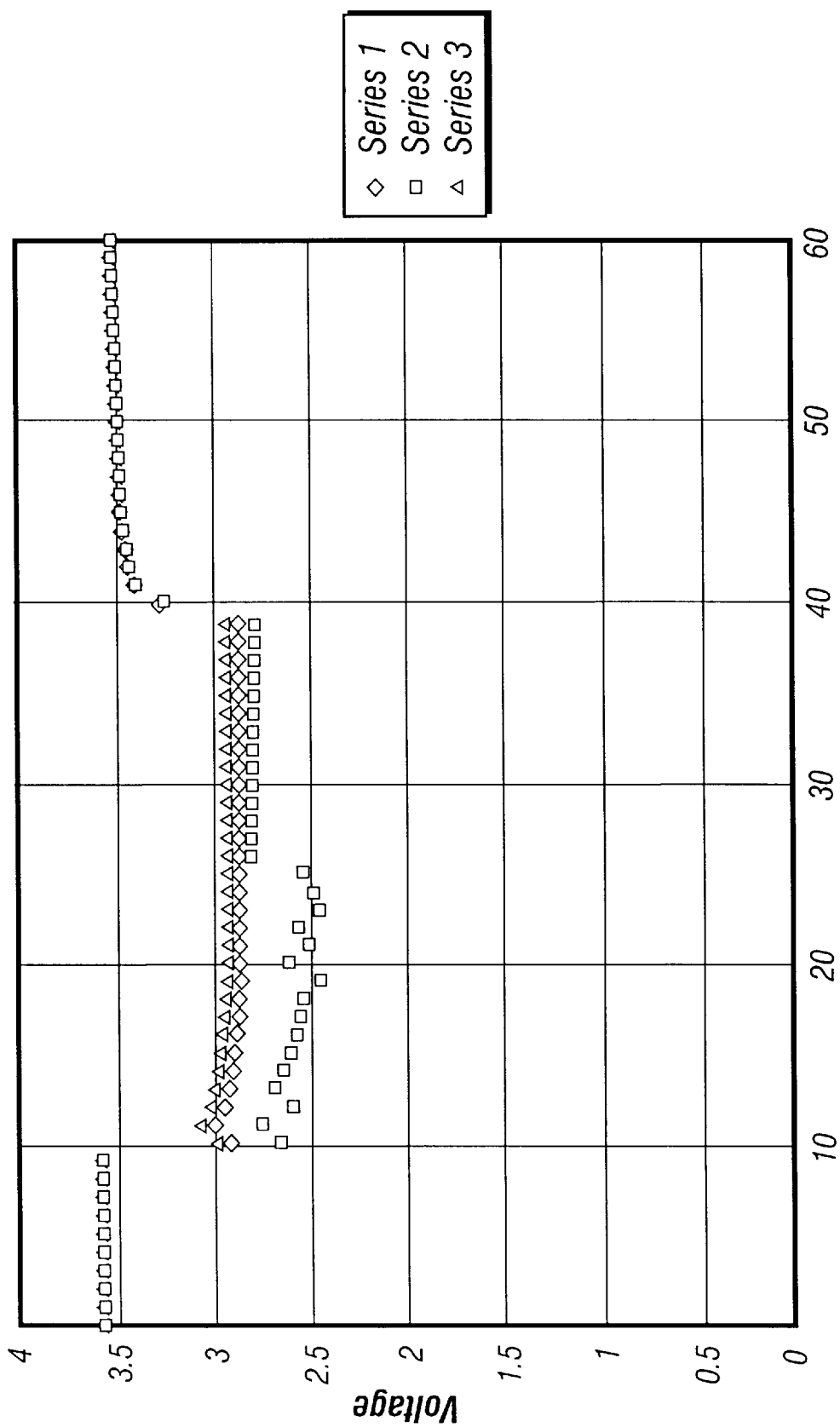
Figure 15:
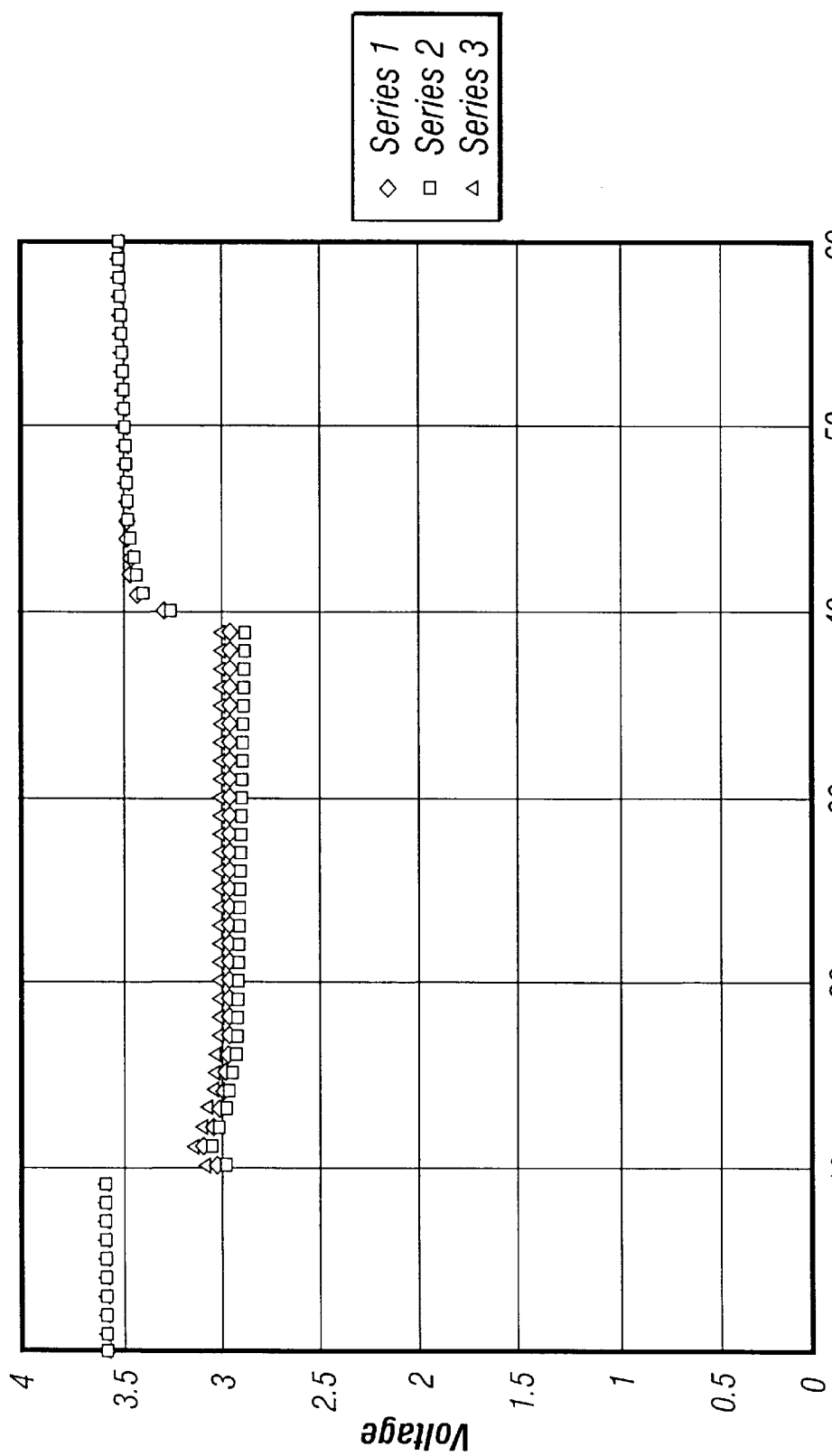
Figure 16:
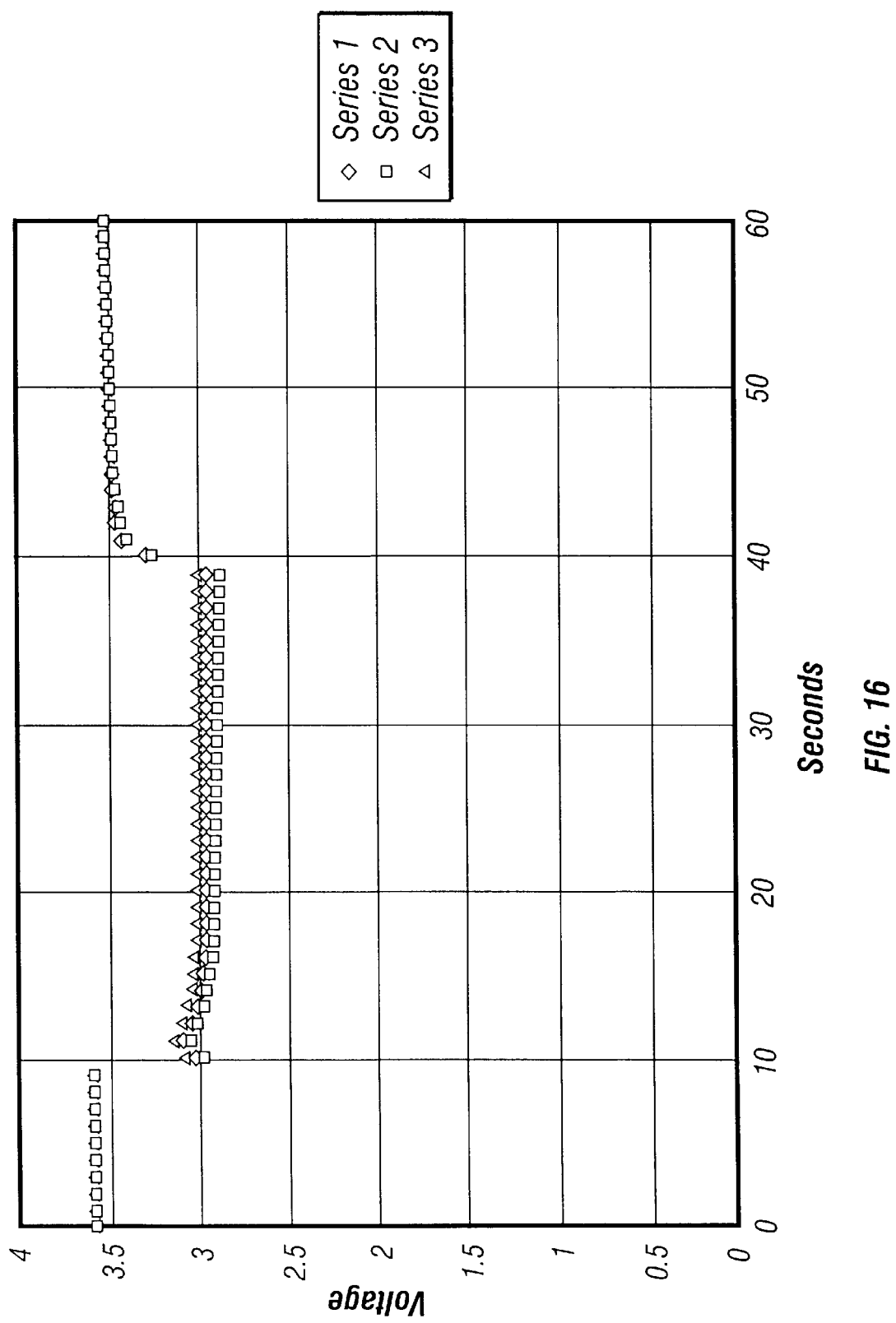

Referring now to FIG. 12 in conjunction with FIG. 4, there is illustrated a preferred embodiment BLI composite electrode structure 4 having a carbon electrode (not shown) and an idealized physical layout of a two-part anode structure 2 before and after a certain amount of cell capacity is removed. For ease of interpretation, the other cell components (i.e. cathode, current collectors, separators, etc.) are omitted. As shown in FIG. 12, the anode structure 2 of an undischarged composite cell 4 is composed of two parts 2.1 and 2.2 with each part having a distinct surface area and mass, A1, A2, M1, and M2, respectively. For this exemplary cell construction, the areas and masses are chosen as follows: A1>A2 and M1>M2, where A2/A1=0.5; M2/M1= 0.25; and M2/(M1+M2)=0.80. Under this optimized configuration, a 50% anode electrode area change will occur after 80% of cell capacity has occurred. A series of tests were run to analyze the performance of these "50/80" BLI machine-made cells.

Referring now to FIGS. 13–16, there is illustrated a sequence of 4 graphs indicating a time lapse look at a virgin (undepleted) BLI "50/80" machine made cells at ambient temperatures. Each figure is approximately 2 minutes apart from each other. The data shows the effect of passivation and how the BLI interrogation method depassivates the battery. The plots show 3 cell voltages versus time in seconds. From time 1 to 10 seconds, the 50/80 cell has no load, from 10 to 40 seconds cell has 1 amp load, and from 40 to 60 seconds cell is again at no load. At an initial application of load via an interrogation box (not shown) (FIG. 13), the voltage of all 3 cells drops to 0.5 volts. After 5 to 10 seconds, the voltage rises to near normal level. Upon the second application of load (FIG. 14), all 3 50/80 cells resume voltage behavior they had at the end of the prior load of FIG. 13. Note that cell voltages are all increasing compared to the first pulse. At the third application of load (FIG. 15), all 3 50/80 cell voltages are nearly the same and at nominal level. At the fourth application of load (FIG. 16), there is no change from the prior pulse (FIG. 15) and the 50/80 cells are now considered fully depassivated. The interrogating voltage of each 50/80 cell is now read after the $15^{th}$ second mark. This point was selected to represent the time for load on the interrogating box for the following reasons: a) the cell is not unduly depleted if pulse is applied many times; b) the cell voltage does not change significantly after 15 seconds; and c) a short duration minimizes excess heat dissipation problems with interrogating box.

Figure 17:
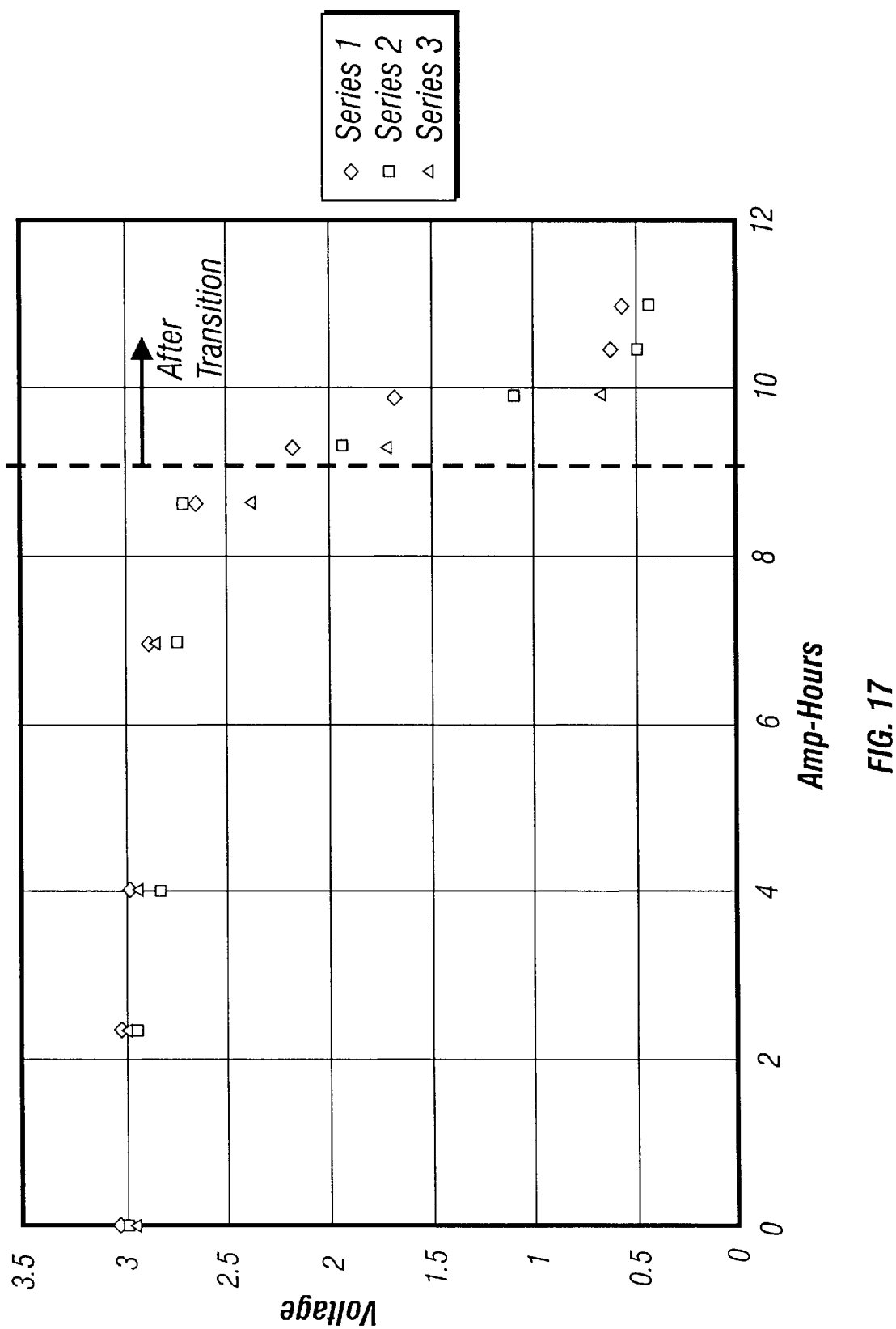
FIG. 17 graphically represents the interrogating current versus amp-hours for three BLI 50/80 cells having an 11.4 amp-hour capacity where the cells were depleted at 130° C. and interrogated at ambient temperature.

Referring now to FIG. 17, the interrogating voltage versus amp-hours is plotted for three BLI 50/80 cells (11.4 amp-hour capacity). The measurement was made at ambient temperature although cells were depleted in 9 separate runs at 130° C. The precise voltage indicated for each cell is the voltage after 15 seconds of 1 amp constant current load. Each cell was loaded with 25 mA to represent tool load and heated to 130° C. for various lengths of time to represent downhole temperatures. Each of the 3 cells had the same 9 runs segment duration. These cells were designed to have a 50% area change after 80% of capacity was consumed. The approximate capacity of the 3 cells was 11.4 Amp-Hours. The 80% mark is indicated by a vertical dashed line at 9.1 Amp-Hour. Cells prior to their transition have a nominal interrogating voltage range of 3.0 volts to 2.25 volts. Cells after their transition have an interrogating voltage of 2.0 to 0.5 volts. It is believed that the transition is not abrupt due to the gradual dissolution of the anode structure thereby leaving islands of lithium with increasing space between them.

Figure 18:
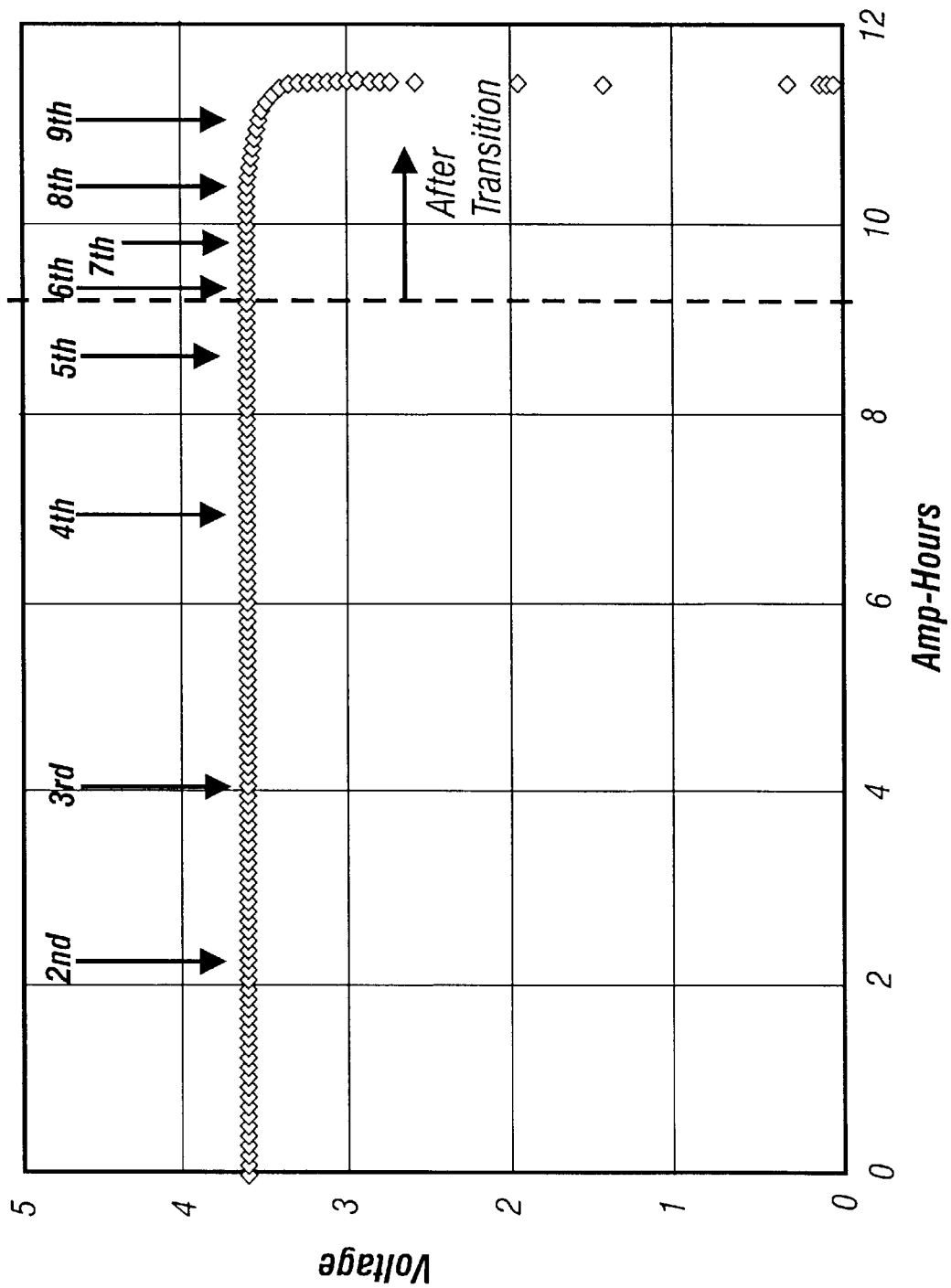
FIG. 18 is a composite plot of downhole battery voltage (at 130° C.) versus amp-hours for one representative BLI 50/80 cell.

Referring now to FIG. 18, downhole battery voltage versus amp-hours is plotted for one representative BLI 50/80 cell at 130° C. The cell has a 25 mA current as applied by a 150 ohm resistor. The cell was depleted in 9 separate and distinct runs at 130° C. with each run being interrupted by a 25° C. cooldown and no-load condition from either several hours to several days. All 9 runs of each cell appear to seamlessly connect to each other. No mathematical or graphical measures were made on the data when combining the 9 runs into one continuous plot. Note that although the transition at 9.1 amp-hours is visible at the ambient temperature interrogation (see FIG. 17), there is no indication of any voltaic disturbance at this point in time (see FIG. 18), as discerned by the downhole tool. The battery has 2.3 amp-hours remaining after the transition has occurred. At 25 mA rate, this corresponds to 92 hours. With a different tool load of 13 mA, this corresponds to more than 175 hours of further life.

Figure 19:
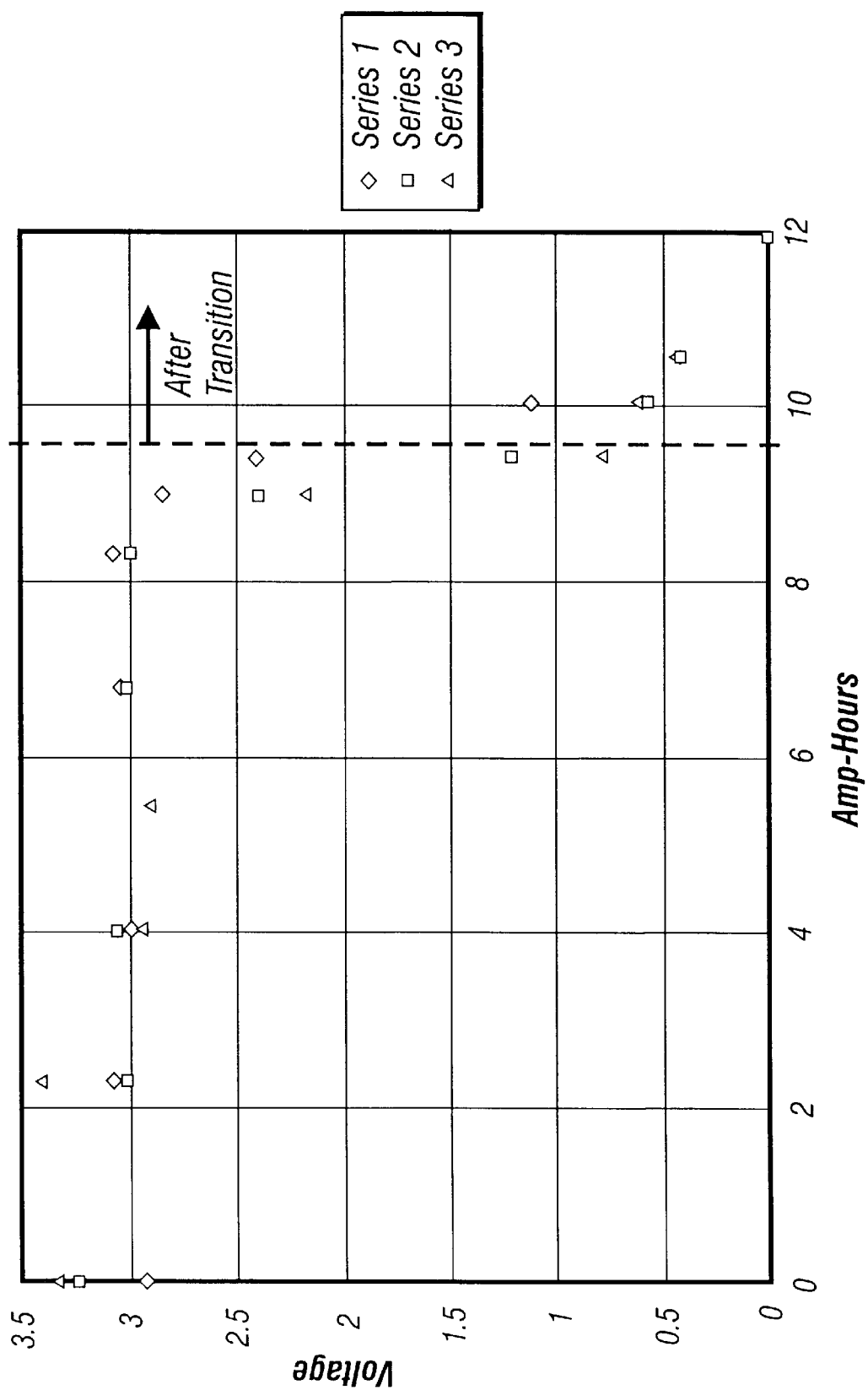
FIG. 19 graphically represents the interrogating current versus amp-hours for three BLI 50/80 cells having an 11.4 amp-hour capacity where the cells were depleted at 100° C. and interrogated at ambient temperature.

Referring now to FIG. 19, this data is similar to that depicted in FIG. 17, except that 3 different samples of BLI 50/80 cells are used and the downhole temperature is now 100° C. Cells at this temperature have a slightly higher capacity due to less self-discharge at this cooler temperature. The 80% mark is now located at 9.6 Amp-Hours. The data on these 3 cells show their transition at the indicated line.

Figure 20:
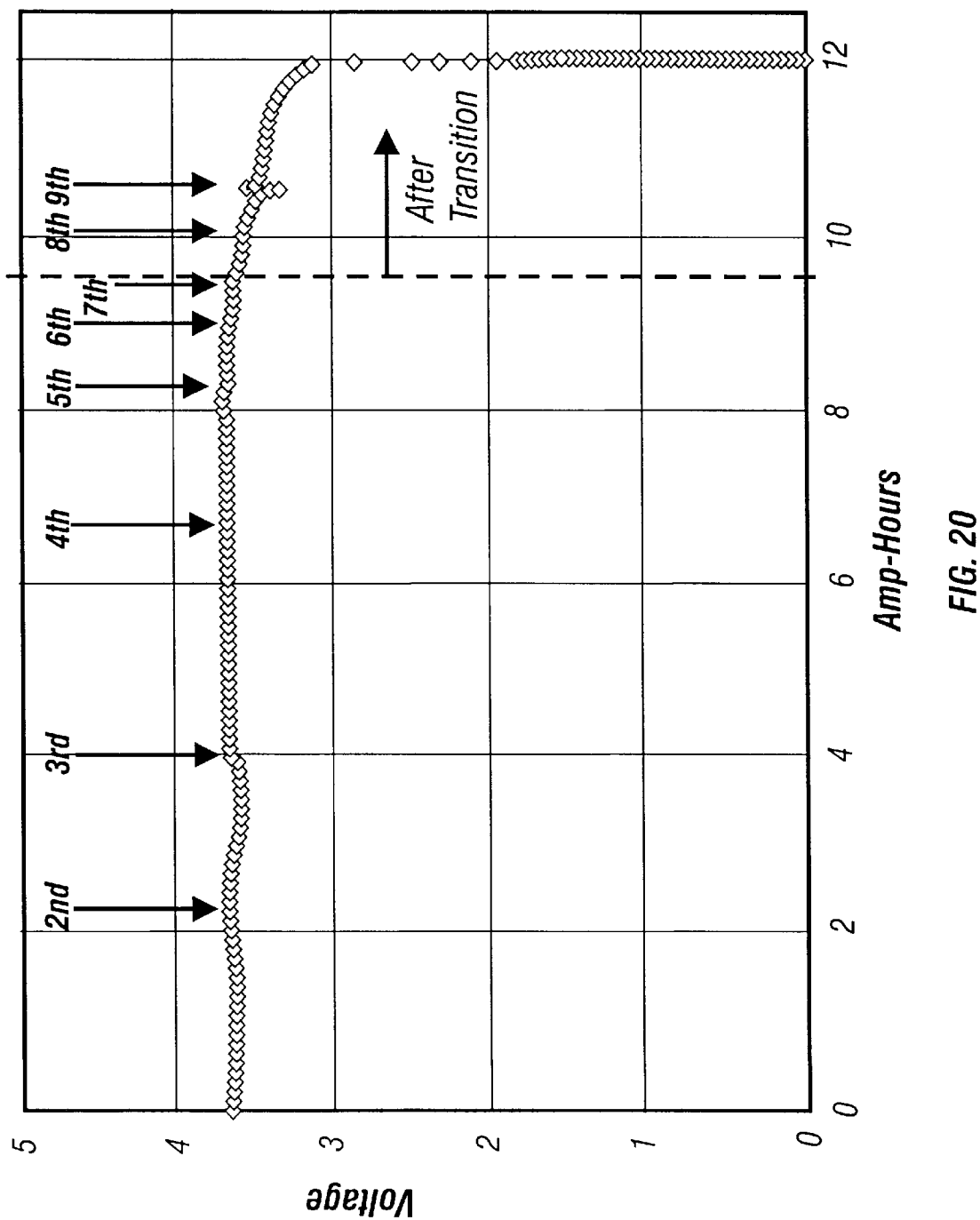
FIG. 20 is a composite plot of downhole battery voltage (at 100° C.) versus amp-hours for three representative BLI 50/80 cells.

Referring now to FIG. 20, this data is similar to that depicted in FIG. 18, except 3 different samples of BLI 50/80 cells are used and the downhole temperature is now 100° C. As in FIG. 18, note that the respective end of life comes with little advance indications.

Figure 21:
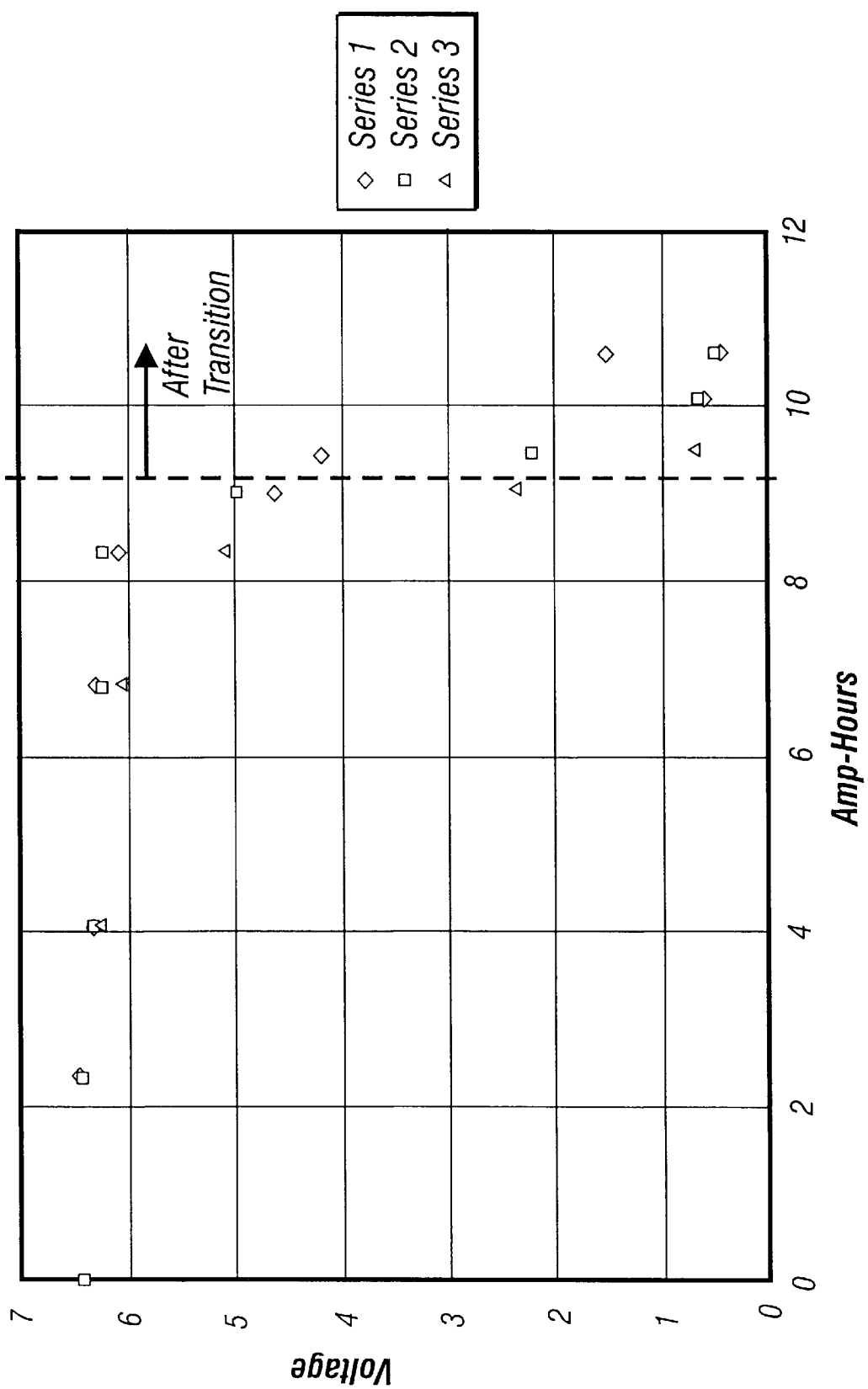
FIG. 21 is the same type of graph as FIGS. 18 and 20 except that it represents a graphical plotting of 3 BLI packs at 100° C. for 9 runs followed by interrogation at ambient temperature. Each BLI pack consists of 2 BLI 50/80 cells in series connection.

Referring now to FIG. 21, this is the same type of graph as FIGS. 18 and 20 except that it represents a graphical plotting of 3 BLI packs at 100° C. for 9 runs followed by interrogation at ambient temperature. Each BLI pack consists of 2 BLI 50/80 cells in series connection. Since this graph consists of 6 BLI cells the transition shown matches all cells. The utility of the BLI method, as shown in these custom machined cells is demonstrated here. There is no washout of one cell's transition occurring at a different time than its neighbor's transition. Therefore, it appears that both of the cells in series will transition at the same time, and that the BLI methodology has application to single cells and "packs" of multiple series-connected cells.

Figure 22:
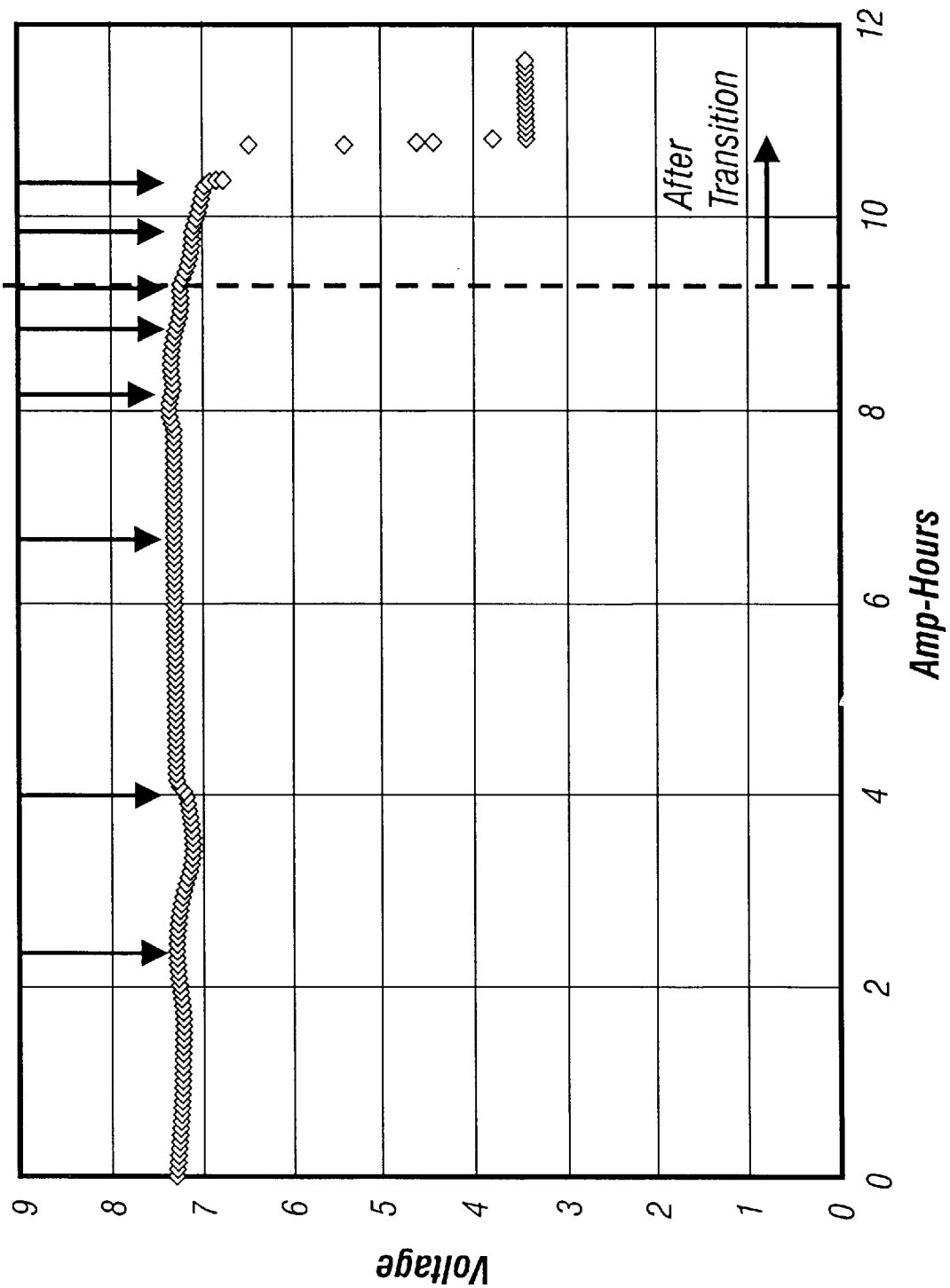
FIG. 22 is the same type of graph as FIGS. 18 and 20 except that it represents a graphical plotting of 1 BLI pack at 100° C. for 9 runs followed by interrogation at ambient temperature.

Referring now to FIG. 22, there is illustrated the same type of graph as FIGS. 18 and 20 except that it is plotting one BLI pack at 100° C. At end of life, one of the two cells still has voltage (although it is below the 5 volt working voltage of the tool). However, by cross checking with an equivalent FIG. 21, it can be inferred that the battery has already passed through its transition.

In accordance with one preferred embodiment of the present invention a novel method and apparatus have been disclosed for determining the state of charge or remaining life of a battery used in the oilfield in downhole tools subjected to temperatures up to 130° C. More particularly, in this preferred embodiment, a LTC battery is utilized that has a two-part anode structure such that one part is designed to be depleted first. This two-part anode structure preferably is designed so one anode has twice the surface area and four times the mass of the other anode so that when the first anode is depleted (i.e., a 50% reduction in the overall surface area of the composite anode has taken place), 80% of the battery's capacity will have been spent (i.e., the battery will have 20% useful life remaining). When the tool is in use (i.e., downhole at elevated temperatures), the transition from the larger anode surface area to the smaller anode surface area does not create a change in tool operating voltage. Therefore, prior to each use of the battery, a field operator is provided with a simple interrogating box that both determines battery remaining life and simultaneously depassivates each battery. In a preferred embodiment, this interrogating box comprises a constant current circuit that is capable of providing a desired magnitude interrogating current for 15 seconds at a time, and is also capable of measuring the cell's voltage output at the end of the 15 seconds. Preferably, the interrogation box has suitable wiring to hook up to each battery, and is capable of holding this voltage readout until being reset. The operator can then refer to a "look-up" table to determine whether, based on this reading, the cell has passed through its transition zone (i.e., has less than 20% of its capacity remaining, or some other designated percentage of remaining capacity). The look-up table can be printed as a table on the outside of the interrogation box, can be maintained in a printed booklet, or could be programmed into a computerized table as part of the interrogation box. In this manner, a tool operator in the field can quickly and easily check all tool batteries prior to a job being run to determine whether each battery has sufficient capacity to last for the entirety of the next job.

Although preferred embodiments have been described above, additional variations are envisioned. For example, the magnitude and/or duration of the interrogating current can be varied, the point at which the voltage is read can be varied, the interrogation temperature can be varied, and the current can also be dynamically administered or modulated in time to optimize the interrogation process for each specific battery style and type. Further, other anode configurations are possible to advantageously measure the state of charge or remaining life of an oilfield service battery, i.e., reversing the positions of the anode and cathode, utilizing a spiral, or jelly-roll configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An oilfield services downhole tool battery having a remaining life indicator comprising:

a housing containing one or more electrochemical cells having an internal anode means which selectively gets consumed at a predetermined state of discharge thereby creating a step change in the cell's output voltage which is greater under ambient temperatures than at downhole temperatures; and remaining life indicator means for providing an indication of remaining life by detecting the step change in the cell's output voltage at ambient temperature upon administering a suitable current load.

2. The oilfield services battery of claim 1 wherein each of said one or more electrochemical cells further comprise:

a) alkali anode means comprising a first member having a first mass and a first surface area exposed to the interior of said cell and a second member having a second mass and a second surface area integrally positioned with respect to said first member such that said first and second anode members comprise a composite structured anode pair, said first and second members being of the same electrochemically active material;

b) oxyhalide cathode means comprising one or more surface members having surface areas coextensive with said exposed surface areas of said anode means;

c) electrolyte means disposed between said coextensive surface areas of said anode means and said cathode means;

d) said anode means, cathode means and electrolyte means being formed of respective materials adapted to provide a substantially constant output voltage at downhole temperatures after depletion of one of said anode members; and e) said one anode member being depleted prior to said other anode member to produce a step change in said output voltage from a higher substantially constant output voltage to a lower substantially constant output voltage when measured at ambient temperature.

3. The oilfield services battery of claim 2 wherein said first and second anode means comprise hollow cylindrical annular structures in coaxial relationship.

4. The oilfield services battery of claim 1 wherein said anode members are formed from an electrochemically active alkali or alkaline earth metal selected from the group consisting of lithium, sodium, potassium, calcium, their alloys and intermetallic compounds, and combinations thereof.

5. The oilfield services battery of claim 4 wherein the electrolyte means includes an oxyhalide depolarizer together with a Lewis acid and Lewis base solute.

6. The oilfield services battery of claim 5 wherein the oxyhalide depolarizer is selected from the group consisting of thionyl chloride, sulfuryl chloride and phosphoroxy chloride.

7. The oilfield services battery of claim 5 wherein the Lewis acid is aluminum chloride and the Lewis base is lithium chloride.

8. The oilfield services battery of claim 2 wherein said cathode means comprises a cylindrical structure inserted into a hollow cylindrical anode means.

9. The oilfield services battery of claim 2 wherein said cathode means and said electrolyte are liquid thionyl chloride and said anode means is lithium.

10. The oilfield services battery of claim 1 wherein the anode means comprises a continuous structure.

11. The oilfield services battery of claim 1 wherein the anode means comprises at least two anodes contained within individual electrochemical cell containers and coupled in parallel by electrically-connective means through their respective cell containers.

12. The oilfield services battery of claim 1 wherein the anode means comprises at least two anodes which are physically separated and coupled in parallel by electrically-connective means.

13. The oilfield services battery of claim 2 wherein said second anode is positioned behind said first anode and is not exposed to the interior of said cell until said first anode is substantially depleted.

14. The oilfield services battery of claim 2 wherein the mass of said first anode is substantially the same as the mass of said second anode and the surface area of said first anode is two times greater than the surface area of said second anode.

15. The oilfield services battery of claim 2 wherein the mass of said first anode is four times the mass of said second anode and the surface area of said second anode is 0.75 of the surface area of said first anode.

16. The oilfield services battery of claim 2 wherein the mass of said first anode is four times greater than the mass of said second anode and the surface area of said first anode is twice the surface area of said second anode.

17. A method of determining the remaining life in an oilfield services battery prior to or after the use or reuse of said battery for downhole oilfield operations comprising the steps of:

a) providing an oilfield services downhole tool battery having a remaining life indicator comprising a housing containing one or more electrochemical cells having an internal anode means which selectively gets consumed at a predetermined state of discharge thereby creating a step change in the cell output voltage which is greater under ambient temperatures than at downhole temperatures and remaining life indicator means capable of detecting the step change in the cell output voltage at ambient temperatures upon administering a suitable current load;

b) interrogating said battery at the surface at ambient temperatures prior to use or reuse sufficient to acquire repeatable loaded voltage values; and c) comparing the loaded voltage values with predetermined values of voltage versus capacity for said battery to determine whether said step change in output voltage has occurred indicating that a predetermined state of discharge has elapsed.

18. The method of claim 17 wherein the interrogating step further comprises the steps of:

a) connecting said battery to an interrogating device;

b) depassivating said battery by providing to said battery from said interrogating device a sufficient magnitude current pulse for a sufficient length of at a time until repeatable loaded voltage values are observed; and c) measuring the cell's voltage output.

19. The oilfield services battery of claim 2 wherein said anode means comprises a cylindrical structure inserted into a hollow cylindrical cathode means.

20. The oilfield services battery of claim 2 wherein said first anode nests behind said second anode and is also exposed to the interior of said cell.

21. The oilfield services battery of claim 2 wherein the mass of said first anode is an arbitrary ratio of the mass of said second anode and the surface area of said first anode is an arbitrary multiplier of the surface area of said second anode.

22. An oilfield services downhole tool battery having a remaining life indicator comprising:

a housing;

an electrochemical cell having an internal anode configured to be selectively consumed at a predetermined state of discharge thereby creating a step change in the cell's output voltage which is greater under ambient temperatures than under downhole temperatures; and a remaining life indicator arranged to selectively apply a current load to the cell at ambient temperatures and provide an indication of remaining life by detecting the step change.

* * * * *